(12) United States Patent
Raihn et al.

(10) Patent No.: US 10,657,305 B2
(45) Date of Patent: May 19, 2020

(54) TECHNIQUE FOR DESIGNING ACOUSTIC MICROWAVE FILTERS USING LCR-BASED RESONATOR MODELS

(71) Applicant: Resonant, Inc., Santa Barbara, CA (US)

(72) Inventors: Kurt F. Raihn, Goleta, CA (US); Patrick J. Turner, Santa Barbara, CA (US); Neal O. Fenzi, Santa Barbara, CA (US)

(73) Assignee: Resonant Inc., Santa Barbara, CA (US)

( * ) Notice: Subject to any disclaimer, the term of this patent is extended or adjusted under 35 U.S.C. 154(b) by 0 days.

(21) Appl. No.: 16/400,717

(22) Filed: May 1, 2019

(65) Prior Publication Data

US 2019/0392090 A1 Dec. 26, 2019

Related U.S. Application Data

(63) Continuation of application No. 15/925,609, filed on Mar. 19, 2018, now Pat. No. 10,437,952, which is a
(Continued)

(51) Int. Cl.
*G06F 9/455* (2018.01)
*G06F 17/50* (2006.01)
(Continued)

(52) U.S. Cl.
CPC .......... *G06F 30/327* (2020.01); *G06F 30/30* (2020.01); *G06F 30/36* (2020.01); *G06F 30/367* (2020.01);
(Continued)

(58) Field of Classification Search
USPC .......... 716/122, 128, 130, 132, 134
See application file for complete search history.

(56) References Cited

U.S. PATENT DOCUMENTS 8,701,065 B1 * 4/2014 Silver ............... H03H 9/465
716/110
8,751,993 B1 * 6/2014 Fenzi ............... G06F 17/5045
716/122
(Continued)

OTHER PUBLICATIONS

PCT International Search Report for PCT/US2016/061726, dated Apr. 18, 2017 (6 pages).
(Continued)

*Primary Examiner* — Brian Ngo
(74) *Attorney, Agent, or Firm* — Foley & Lardner LLP

(57) ABSTRACT

A method for designing a narrowband acoustic wave microwave filter including: generating a modeled filter circuit design having circuit elements including an acoustic resonant element defined by an electrical circuit model that includes a parallel static branch, a parallel motional branch, and one or both of a parallel Bragg Band branch that models an upper Bragg Band discontinuity and a parallel bulk mode function that models an acoustic bulk mode loss; and generating a final circuit design. Generating the final circuit design includes optimizing the modeled filter circuit design to generate an optimized filter circuit design; comparing a frequency response of the optimized filter circuit design to requirements; selecting the optimized filter circuit design for construction into the actual acoustic microwave filter based on the comparison; and transforming the optimized filter circuit design to a design description file for input to a construction process.

23 Claims, 30 Drawing Sheets

Related U.S. Application Data continuation of application No. 15/471,789, filed on Mar. 28, 2017, now Pat. No. 9,959,378, which is a continuation of application No. 15/366,369, filed on Dec. 1, 2016, now Pat. No. 9,654,078, which is a continuation of application No. 14/941,477, filed on Nov. 13, 2015, now Pat. No. 9,525,393.

(51) Int. Cl.

| | | |
|---|---|---|
| *G06F 30/327* | (2020.01) | |
| *H03H 9/52* | (2006.01) | |
| *H03H 9/56* | (2006.01) | |
| *H03H 9/60* | (2006.01) | |
| *H03H 9/64* | (2006.01) | |
| *G06F 30/30* | (2020.01) | |
| *G06F 30/36* | (2020.01) | |
| *G06F 30/367* | (2020.01) | |
| *H03H 3/007* | (2006.01) | |
| *H03H 3/04* | (2006.01) | |
| *H03H 3/10* | (2006.01) | |
| *G06F 119/18* | (2020.01) | |
| *H03H 9/54* | (2006.01) | |

(52) U.S. Cl.
CPC ............ *H03H 3/0076* (2013.01); *H03H 3/04* (2013.01); *H03H 3/10* (2013.01); *H03H 9/525* (2013.01); *H03H 9/568* (2013.01); *H03H 9/605* (2013.01); *H03H 9/6483* (2013.01); *G06F 2119/18* (2020.01); *H03H 9/54* (2013.01); *H03H 9/6406* (2013.01); *H03H 2003/0414* (2013.01)

(56) References Cited

U.S. PATENT DOCUMENTS

| | | | |
|---|---|---|---|
| 2008/0129414 A1 | 6/2008 | Lobl et al. | |
| 2009/0002102 A1* | 1/2009 | Tsuzuki | H01P 1/20 333/204 |
| 2009/0273408 A1* | 11/2009 | Inoue | H03H 9/725 333/4 |
| 2014/0282311 A1* | 9/2014 | Turner | H03H 9/465 716/104 |

OTHER PUBLICATIONS

PCT Written Opinion of the International Search Authority for PCT/US2016/061726, dated Apr. 18, 2017 (9 pages).

K.S. Van Dyke, Piezo-Electric Resonator and its Equivalent Network Proc. IRE, vol. 16, 1928, pp. 742-764.

Gong, Songbin et al., Design and Analysis Lithium Niobate-Based High Electromechanical Coupling RF-MEMS Resonators for Wideband Filtering, IEEE Transactions on Microwave Theory and Techniques, IEEE Service Center, Piscataway, NJ, US., vol. 61, No. 1, Jan. 1, 2013, pp. 403-414.

Jamneala, Tiberiu et al., Modified Mason Model for Bulk Acoustic Wave Resonators, IEEE Transactions on Ultrasonics, Ferroelectrics and Frequency Control, IEEE, US, vol. 55, No. 9, Sep. 1, 2008, pp. 2025-2029.

Morgan, David, Resonators and Low-Loss Filters, In: David Morgan: Surface Acoustic Wave Filters with Applications tc ::lectronic Communications and Signal Processing, Jan. 1, 2007, Elsevier Ltd., Oxford, UK, XP055343050, ISBN: ☐78-0-12-372537-0, pp. 25-33.

Ruppel, Clemens C. W. et al., Review of models for low-loss filter design and applications, Ultrasonics Symposium, 1994. Proceedings., 1994 IEEE Cannes, France 1-4, Nov. 1994, New York, NY, USA, IEEE, US, Oct. 31, 1994, :>pp. 313-324, vol. 1, XP032084376, DOI: 10.1109/ULTSYM.1994.401602.

\* cited by examiner

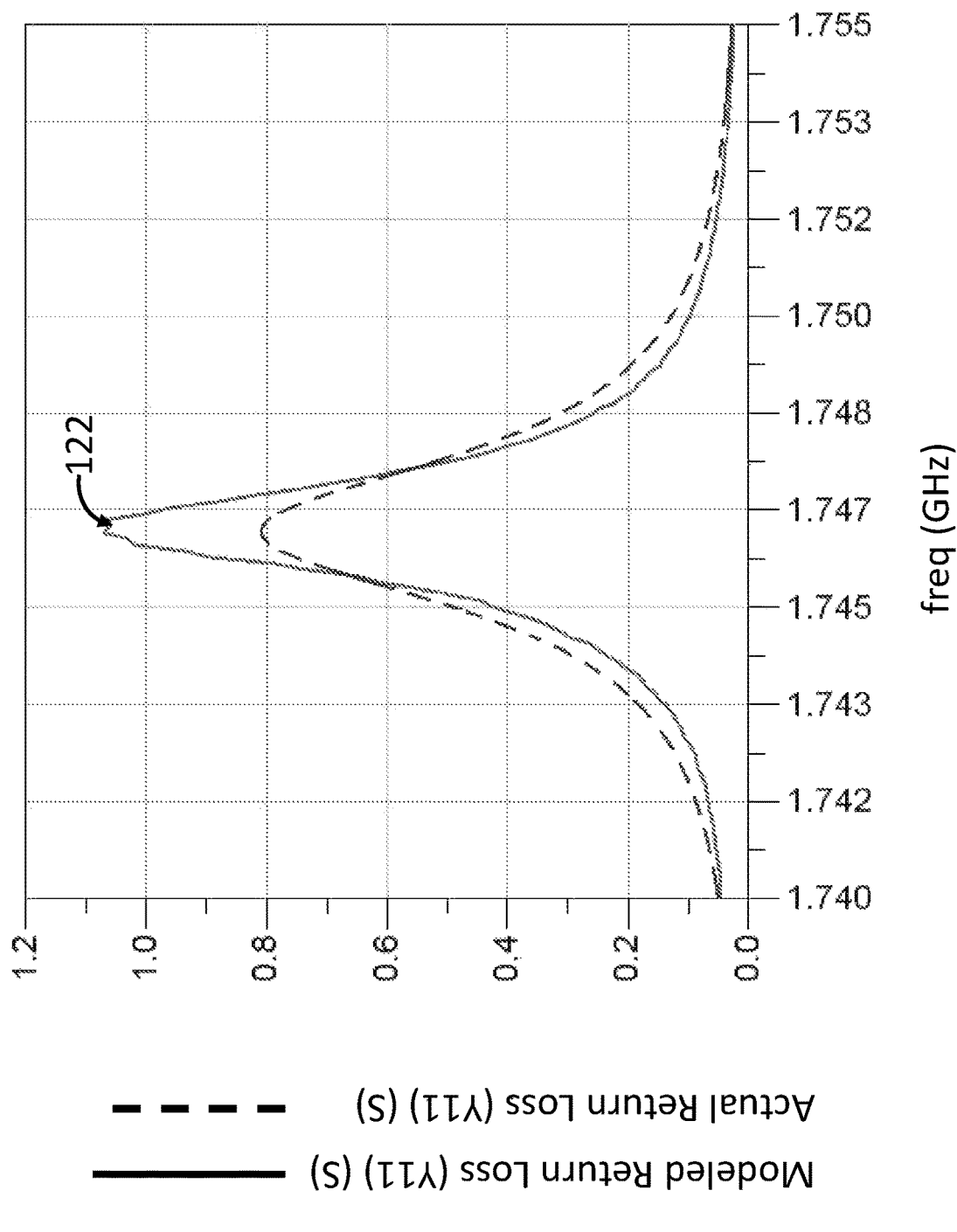

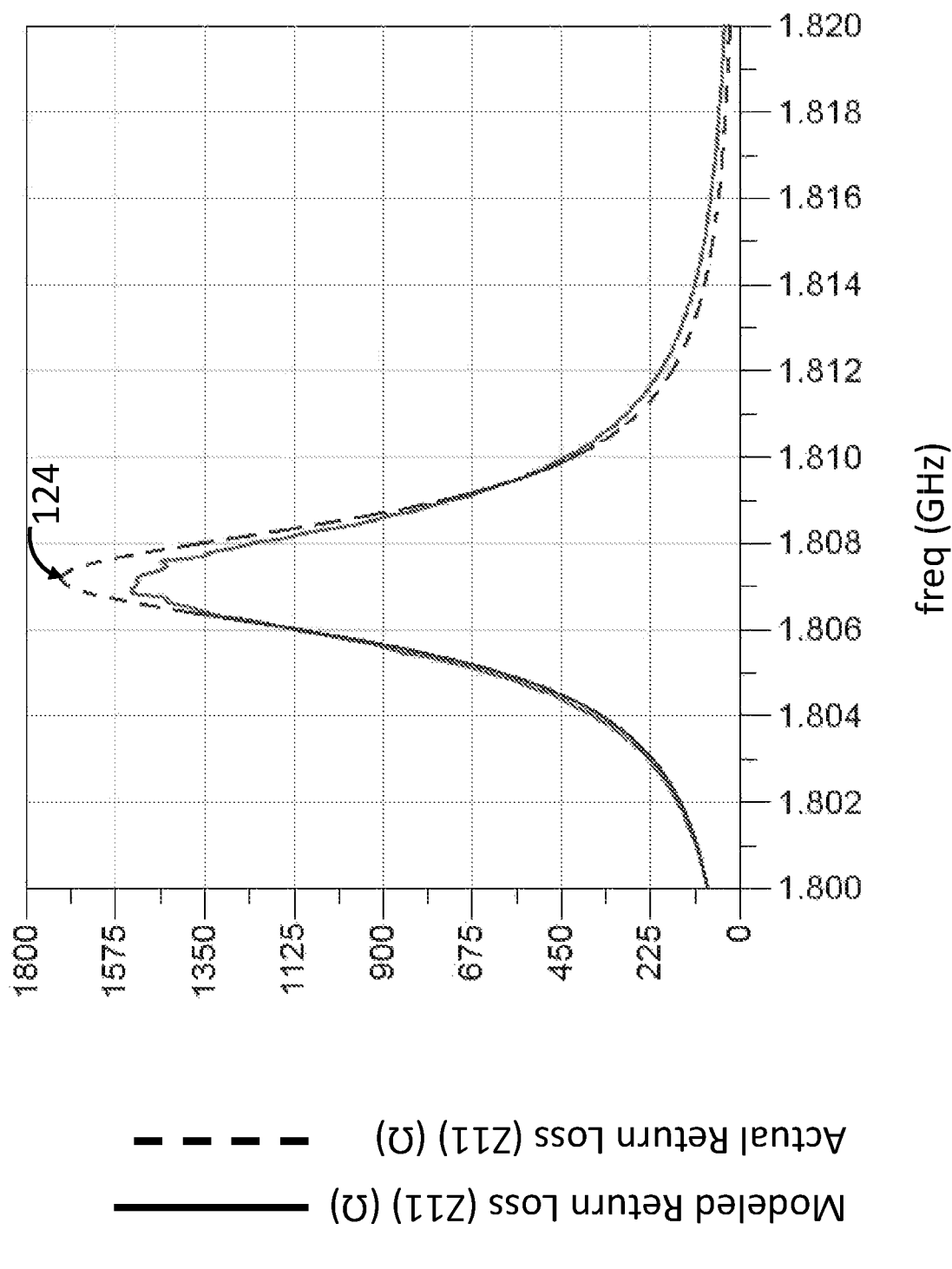

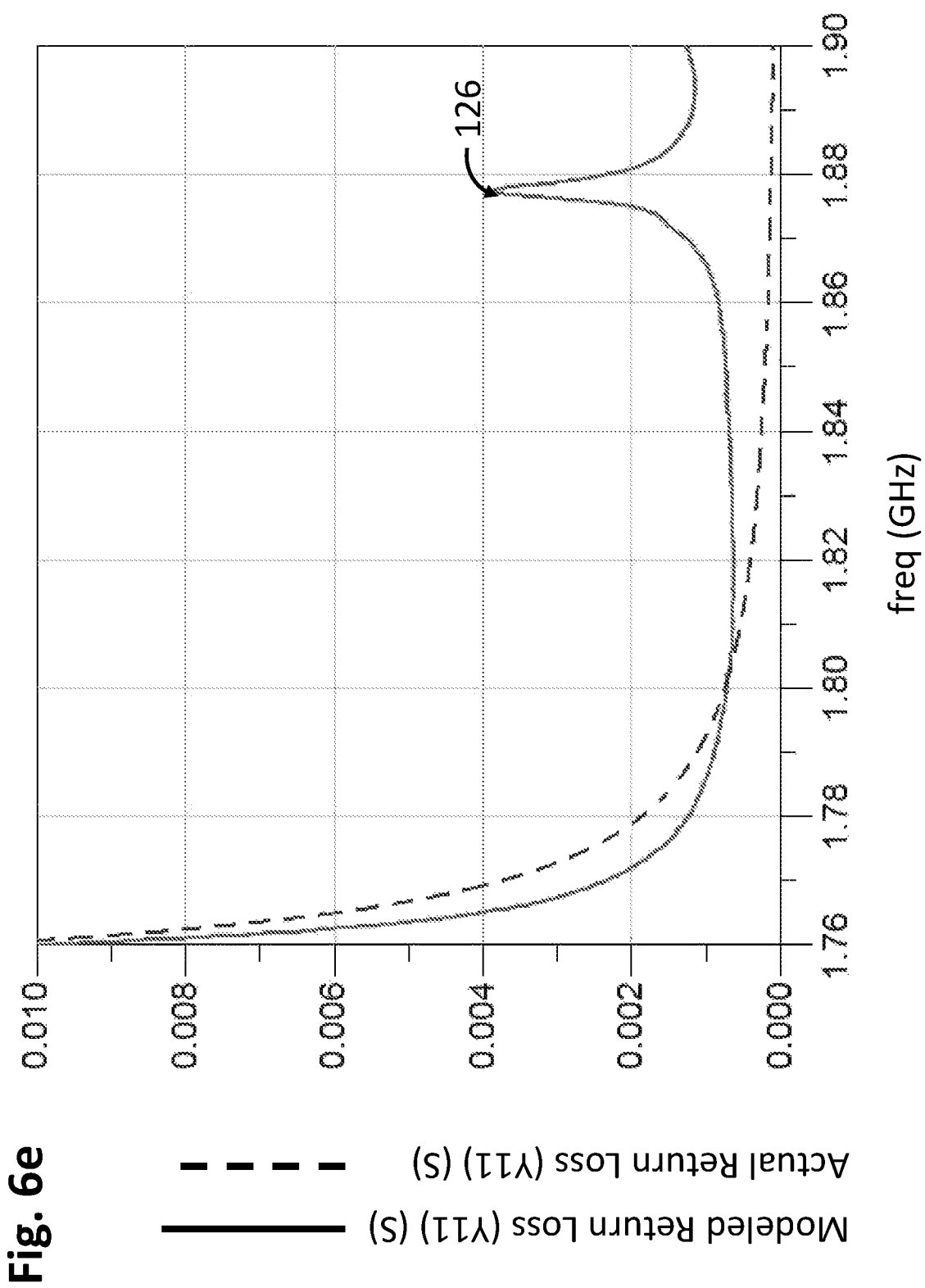

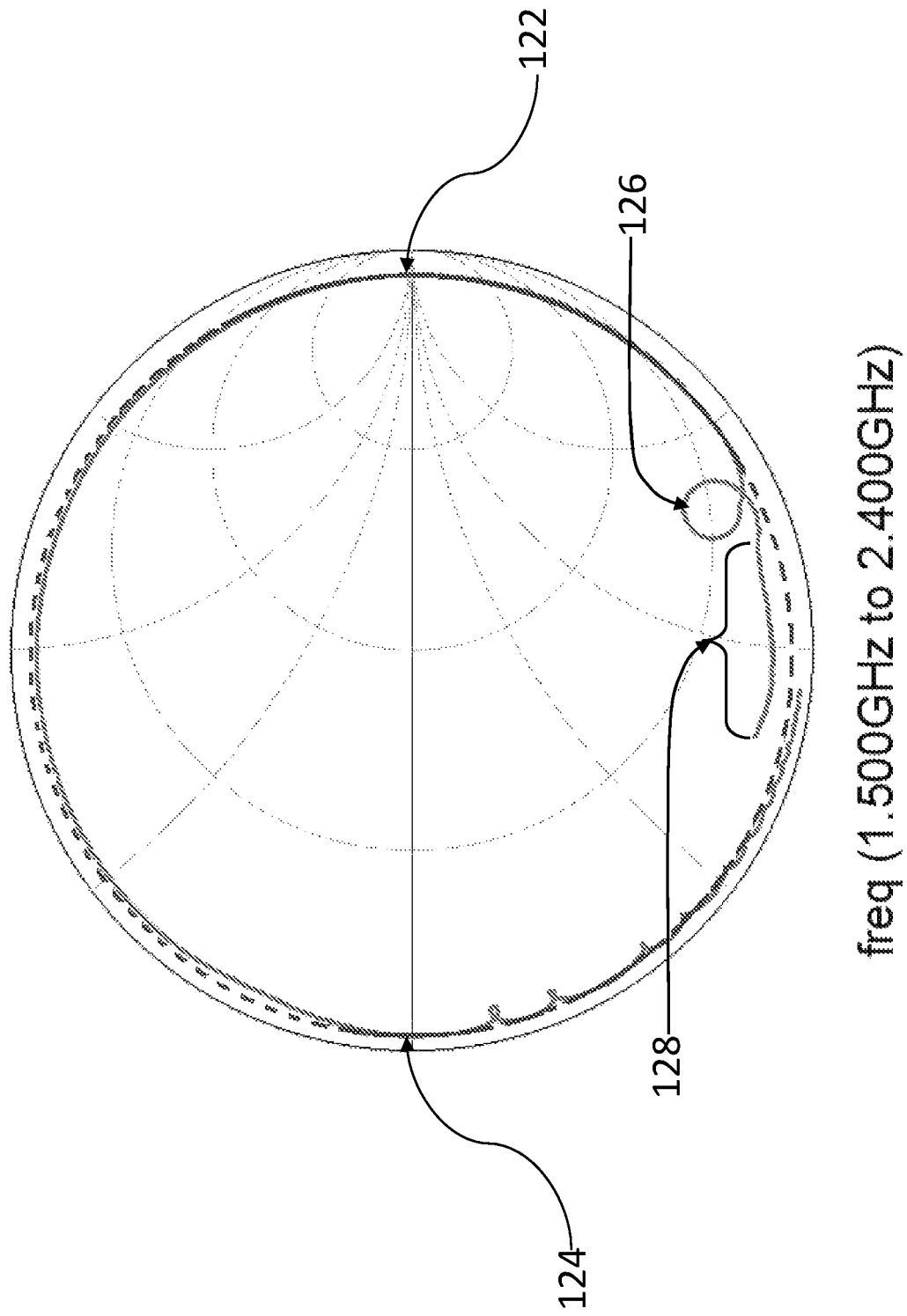

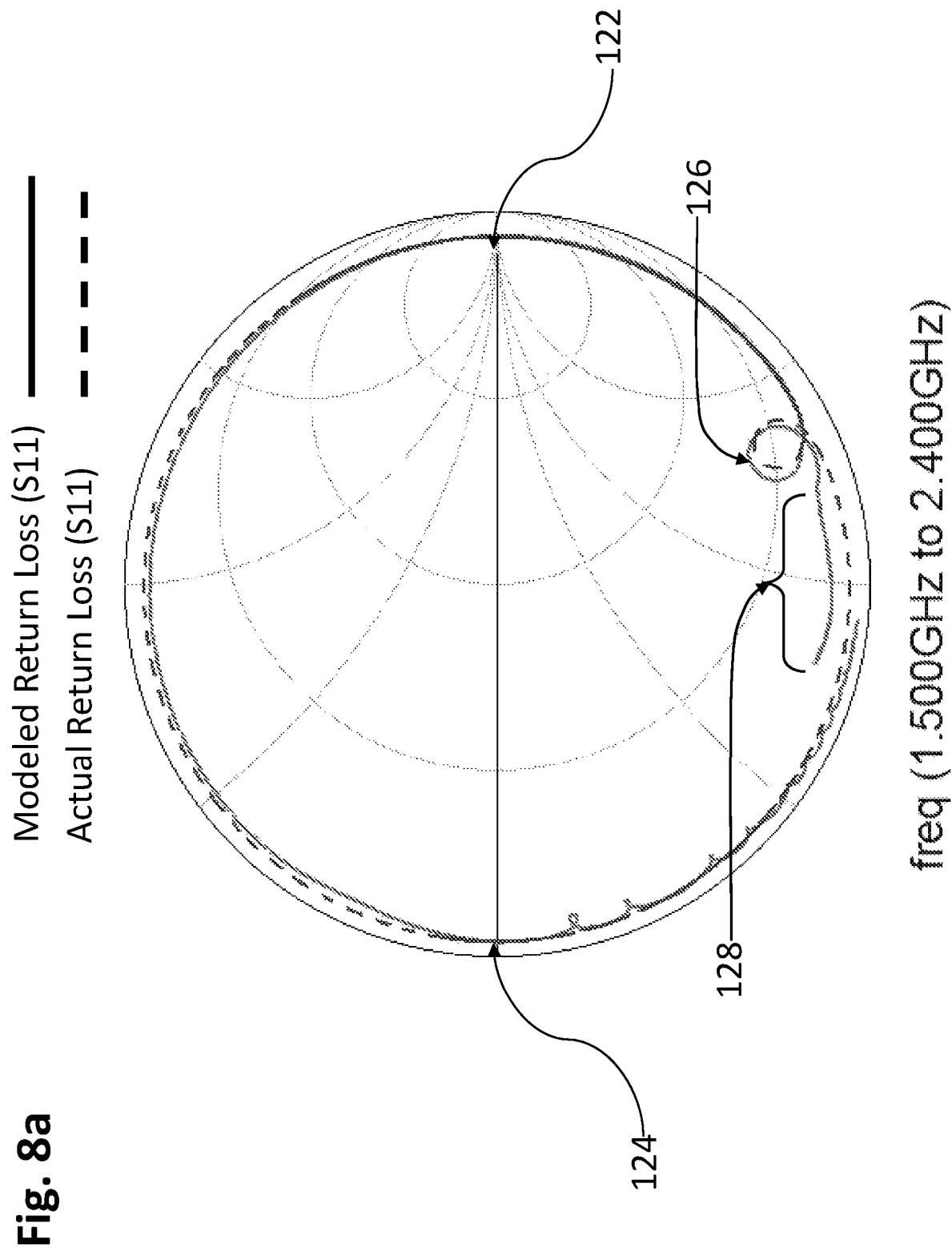

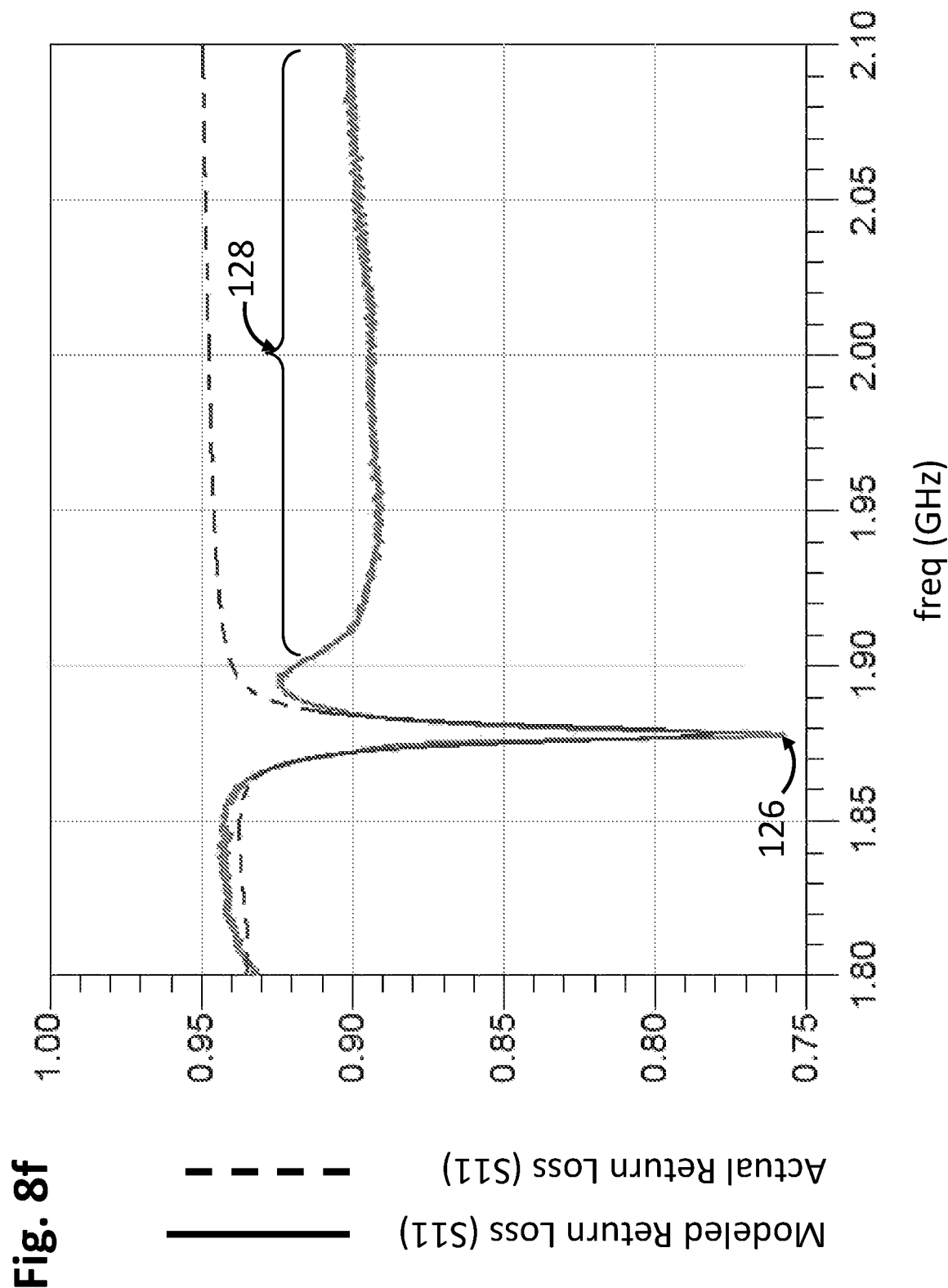

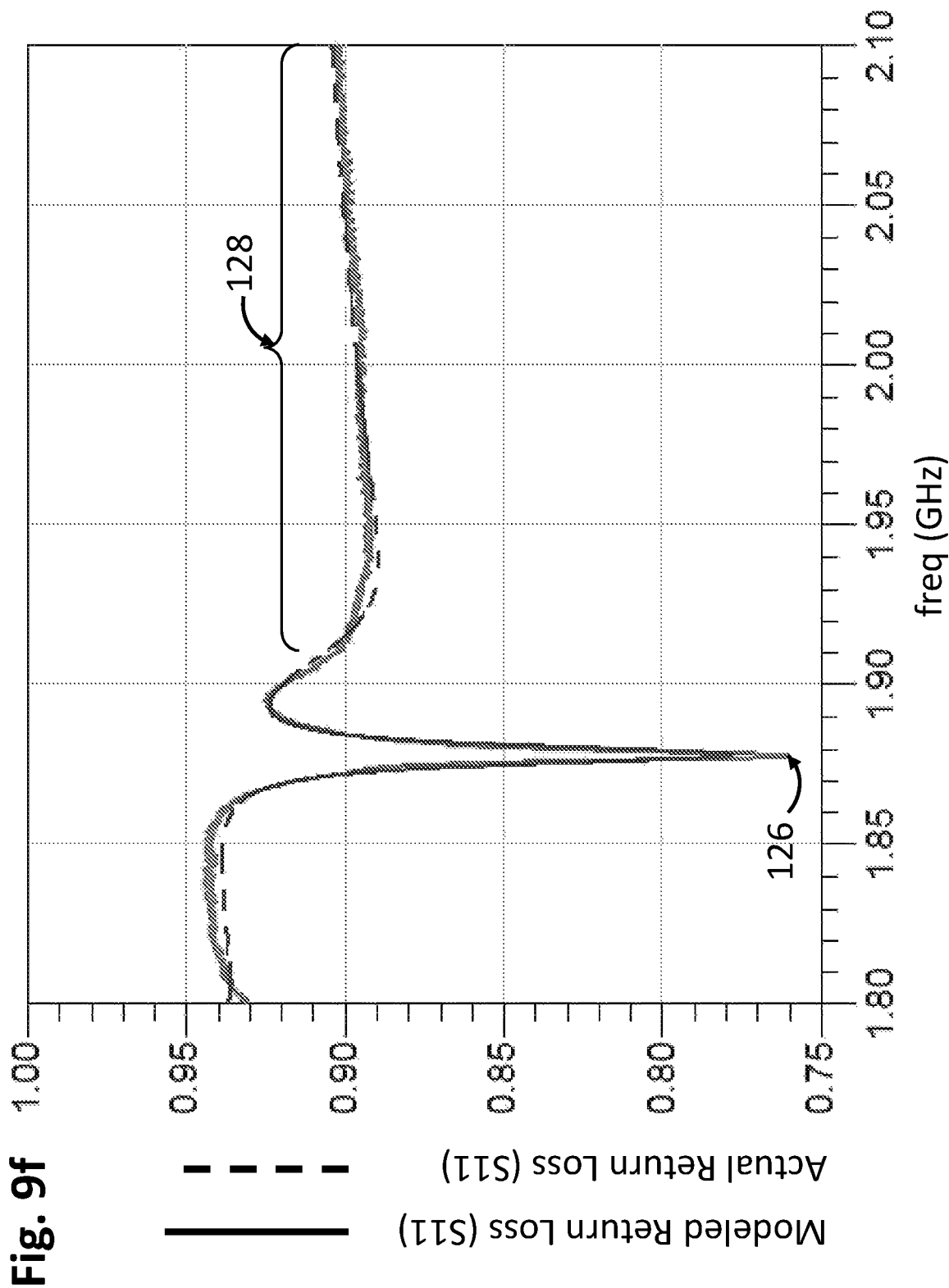

TECHNIQUE FOR DESIGNING ACOUSTIC MICROWAVE FILTERS USING LCR-BASED RESONATOR MODELS

RELATED APPLICATION DATA

The present application claims the benefit of and priority as a continuation to U.S. patent application Ser. No. 15/925,609, filed Mar. 19, 2018; which is a continuation of U.S. patent application Ser. No. 15/471,789, filed Mar. 28, 2017, now issued as U.S. Pat. No. 9,959,378; which is also a continuation of U.S. patent application Ser. No. 15/366,369, filed Dec. 1, 2016, now issued as U.S. Pat. No. 9,654,078; which is also a continuation of U.S. patent application Ser. No. 14/941,477, filed Nov. 13, 2015, now issued as U.S. Pat. No. 9,525,393. Priority is claimed pursuant to 35 U.S.C. § 119 and 120. The above-noted Patent Applications are incorporated by reference as if set forth fully herein.

FIELD OF THE INVENTION

The present inventions generally relate to microwave filters, and more particularly, to acoustic microwave filters designed for narrow-band applications.

BACKGROUND OF THE INVENTION

Electrical filters have long been used in the processing of electrical signals. In particular, such electrical filters are used to select desired electrical signal frequencies from an input signal by passing the desired signal frequencies, while blocking or attenuating other undesirable electrical signal frequencies. Filters may be classified in some general categories that include low-pass filters, high-pass filters, band-pass filters, and band-stop filters, indicative of the type of frequencies that are selectively passed by the filter. Further, filters can be classified by type, such as Butterworth, Chebyshev, Inverse Chebyshev, and Elliptic, indicative of the type of bandshape frequency response (frequency cutoff characteristics) the filter provides relative to the ideal frequency response.

The type of filter used often depends upon the intended use. In communications applications, band pass and band stop filters are conventionally used in cellular base stations, cell phone handsets, and other telecommunications equipment to filter out or block RF signals in all but one or more predefined bands. Of most particular importance is the frequency range from approximately 500-3,500 MHz. In the United States, there are a number of standard bands used for cellular communications. These include Band 2 (~1800-1900 MHz), Band 4 (~1700-2100 MHz), Band 5 (~800-900 MHz), Band 13 (~700-800 MHz), and Band 17 (~700-800 MHz); with other bands emerging.

Microwave filters are generally built using two circuit building blocks: a plurality of resonators, which store energy very efficiently at a resonant frequency (which may be a fundamental resonant frequency $f_0$ or any one of a variety of higher order resonant frequencies $f_1$-$f_n$); and couplings, which couple electromagnetic energy between the resonators to form multiple reflection zeros providing a broader spectral response. For example, a four-resonator filter may include four reflection zeros. The strength of a given coupling is determined by its reactance (i.e., inductance and/or capacitance). The relative strengths of the couplings determine the filter shape, and the topology of the couplings determines whether the filter performs a band-pass or a band-stop function. The resonant frequency $f_0$ is largely determined by the inductance and capacitance of the respective resonator. For conventional filter designs, the frequency at which the filter is active is determined by the resonant frequencies of the resonators that make up the filter. Each resonator must have very low internal resistance to enable the response of the filter to be sharp and highly selective for the reasons discussed above. This requirement for low resistance tends to drive the size and cost of the resonators for a given technology.

The duplexer, a specialized kind of filter is a key component in the front-end of mobile devices. Modern mobile communications devices transmit and receive at the same time (using LTE, WCDMA or CDMA) and use the same antenna. The duplexer separates the transmit signal, which can be up to 0.5 Watt power, from the receive signal, which can be as low as a pico-Watt. The transmit and receive signals are modulated on carriers at different frequencies allowing the duplexer to select them. The duplexer must provide the frequency selection, isolation and low insertion loss in a very small size often only about two millimeters square.

The front-end receive filter preferably takes the form of a sharply defined band-pass filter to eliminate various adverse effects resulting from strong interfering signals at frequencies near the desired received signal frequency. Because of the location of the front-end receiver filter at the antenna input, the insertion loss must be very low so as to not degrade the noise figure. In most filter technologies, achieving a low insertion loss requires a corresponding compromise in filter steepness or selectivity.

In practice, most filters for cell phone handsets are constructed using acoustic resonator technology, such as surface acoustic wave (SAW), bulk acoustic wave (BAW), and film bulk acoustic resonator (FBAR) technologies. The acoustic resonator has two resonances closely spaced in frequency called the "resonance" frequency and the "anti-resonance" frequency (see K. S. Van Dyke, Piezo-Electric Resonator and its Equivalent Network Proc. IRE, Vol. 16, 1928, pp. 742-764). Such acoustic resonators have the advantages of low insertion loss (on the order of 1 dB at the center frequency), compact size, and low cost compared to equivalent inductor/capacitor resonators. For this reason, acoustic resonator implementations are often used for microwave filtering applications in the front-end receive filter of mobile devices. Acoustic resonators are typically arranged in a ladder topology (alternating series and shunt resonators) in order to create band pass filters. Acoustic ladder filters have been very successful for handset applications, with more than a billion units currently sold each year.

The design of modern microwave filters with acoustic resonators requires detailed models to predict the frequency response of the filter, including the upper edge of the Bragg Band and the bulk acoustic loss. In particular, a typical acoustic resonator has a plurality of interdigitized fingers (e.g., 80-100 fingers) that reflect acoustic waves back and forth between the fingers. The bulk loss is an acoustic mode into which some of the acoustic energy is transferred when the fingers of the acoustic resonator are excited. The Bragg Band is the frequency band over which the acoustic reflections between the fingers add in phase to create the resonance. A discontinuity feature in the frequency response occurs at the upper edge of the Bragg Band, i.e., the highest frequency at which the acoustic reflections add in phase. Because the performance of the filter may be compromised if this discontinuity feature falls within the passband, it is important to determine the upper edge of the Bragg Band to ensure that the discontinuity feature falls well outside of the passband of the filter.

A typical acoustic filter design process requires the use of a training mask that consists of a collection of resonators that span the necessary resonator parameters, including, but not limited to, the number of finger pairs, aperture size, pitch, and transducer metal thickness. This training mask must be fabricated, which can take anywhere from a couple weeks to a month. The frequency responses of the training mask, which will include bulk loss and the discontinuity feature corresponding to the upper edge of the Bragg Band, are then measured, which are then used to create Coupling of Modes (COM) models to be used for the simulation, and ultimately the design, of the acoustic filters. Any errors in the training mask measurements can lead to less accurate COM models, which will result in poor correlations between the simulations and filter measurements.

There, thus, remains a need to provide a more efficient and accurate technique for modeling acoustic microwave filters.

SUMMARY OF THE INVENTION

In accordance with the present inventions, a method of designing an acoustic microwave filter in accordance with frequency response requirements is provided. The frequency response requirements may comprise one or more of a frequency dependent return loss, insertion loss, rejection, and linearity. The frequency response requirements may comprises a pass band, e.g., one in the 300 MHz to 300 GHz range, specifically in the 300 MHz to 10.0 GHz range, and more specifically in the 500-3500 MHz range.

The method comprises generating a modeled filter circuit design having a plurality of circuit elements comprising an acoustic resonant element defined by an electrical circuit model. The acoustic resonant element may, e.g., be one of a surface acoustic wave (SAW) resonator, a bulk acoustic wave (BAW) resonator, a film bulk acoustic resonator (FBAR), and a microelectromechanical system (MEMS) resonator. The modeled filter circuit design may have, e.g., an Nth order ladder topology.

The resonator electrical circuit model comprises a parallel static branch, a parallel motional branch, and one or both of a parallel Bragg Band branch that models an upper Bragg Band discontinuity and a parallel bulk mode function that models an acoustic bulk mode loss. In one embodiment, the parallel static branch comprises a static capacitance, and the parallel motional branch comprises a motional inductance and a motional capacitance. The electrical circuit model may optionally comprise at least one resistor that models an electrical loss of the acoustic resonant element. The Bragg Band branch may comprise a series LRC circuit, and/or the bulk mode function may be a hyperbolic tangent function, e.g., in accordance with $$Y = h * \left(1 - \frac{1}{10^{\left(\frac{freq}{w(10^6 - F_b)} + 1\right)}}\right),$$

where Y is the bulk mode loss in dB; h is a scaling factor used to match the loss of the bulk mode; $F_b$ is a frequency in Hz used to match the onset frequency of the bulk mode, w is a scaling factor used to match the steepness of the onset of the bulk mode, and freq is the frequency of the input signal.

The method further comprises optimizing the modeled filter circuit design to generate an optimized filter circuit design, comparing a frequency response of the optimized filter circuit design to the frequency response requirements, and constructing the acoustic microwave filter from the optimized filter circuit design based on the comparison.

In one embodiment, the modeled filter circuit design is generated by defining a physical model of the acoustic resonant element (e.g., by selecting a parameter consisting of at least one of a material, one or more of a number of finger pairs, aperture size, mark-to-pitch ratio, and transducer metal thickness), simulating the physical model of the acoustic resonant element to generate a first frequency response (e.g., by using a Finite Element Model (FEM)), simulating the electrical circuit model of the acoustic resonant element to generate a second frequency response, comparing the first and second frequency responses, and modifying at least one parameter in the electrical circuit model based on the comparison prior to the optimization of the modeled electrical filter circuit design.

Defining the physical model of the acoustic resonant element may comprise, e.g., defining a first set of resonator characteristics for the acoustic resonant element, simulating the physical model of the acoustic resonant element to generate a second set of resonator characteristics, comparing the first and second sets of resonator characteristics, and modifying at least one parameter of the physical model of the acoustic resonant element based on the comparison. Each of the first and second sets of resonator characteristics may comprise, e.g., one or both of a resonant frequency and a static capacitance. In this case, optimizing the modeled filter circuit design may comprise optimizing the resonant frequency and/or a static capacitance.

Comparing the frequency response of the optimized filter circuit design to the frequency response requirements may comprise, e.g., simulating the electrical circuit model of the acoustic resonant element of the optimized filter circuit design to generate a third set of resonator characteristics, simulating the physical model of the acoustic resonant element to generate a fourth set of resonator characteristics, comparing the third set of resonator characteristics to the fourth set of resonator characteristics, modifying the parameter of the physical model of the acoustic resonator based on the comparison, simulating the physical model of the acoustic resonant element with the modified parameter to generate another frequency response, replacing the electrical circuit model of the acoustic resonant element in the optimized filter circuit design with the other frequency response to create a modified optimized filter circuit design, and simulating the modified optimized filter circuit design to create the frequency response. Each of the third and fourth sets of resonator characteristics may comprise one or both of a resonant frequency and a static capacitance.

Other and further aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which:

FIG. 6c is a measured real portion of a y-parameter frequency response of an actual acoustic resonator and a simulated real portion of a y-parameter frequency response of the equivalent MBVD model of FIG. 5a plotted against each other from below the resonant frequency to above the resonant frequency;

FIG. 6d is a measured real portion of a z-parameter frequency response of an actual acoustic resonator and a simulated real portion of a z-parameter frequency response of the equivalent MBVD model of FIG. 5a plotted against each other from below the anti-resonant frequency to above the anti-resonant frequency;

FIG. 6e is a measured real portion of a y-parameter frequency response of an actual acoustic resonator and a simulated real portion of a y-parameter frequency response of the equivalent MBVD model of FIG. 5a plotted against each other from above the resonant frequency to above the upper Bragg Band frequency;

FIG. 7a is a measured s-parameter frequency response of an actual acoustic resonator and a simulated s-parameter frequency response of the equivalent MBVD model of FIG. 5b plotted against each other on a Smith Chart;

FIG. 8a is a measured s-parameter frequency response of an actual acoustic resonator and a simulated s-parameter frequency response of the equivalent MBVD model of FIG. 5c plotted against each other on a Smith Chart;

FIG. 8f is a measured real portion of a s-parameter frequency response of an actual acoustic resonator and a simulated real portion of a s-parameter frequency response of the equivalent MBVD model of FIG. 5c plotted against each other from below the upper Bragg Band frequency to above the upper Bragg Band frequency;

FIG. 9f is a measured real portion of a s-parameter frequency response of an actual acoustic resonator and a simulated real portion of a s-parameter frequency response of the equivalent MBVD model of FIG. 5d plotted against each other from below the upper Bragg Band frequency to above the upper Bragg Band frequency.

DETAILED DESCRIPTION OF THE EMBODIMENTS

Figure 1:
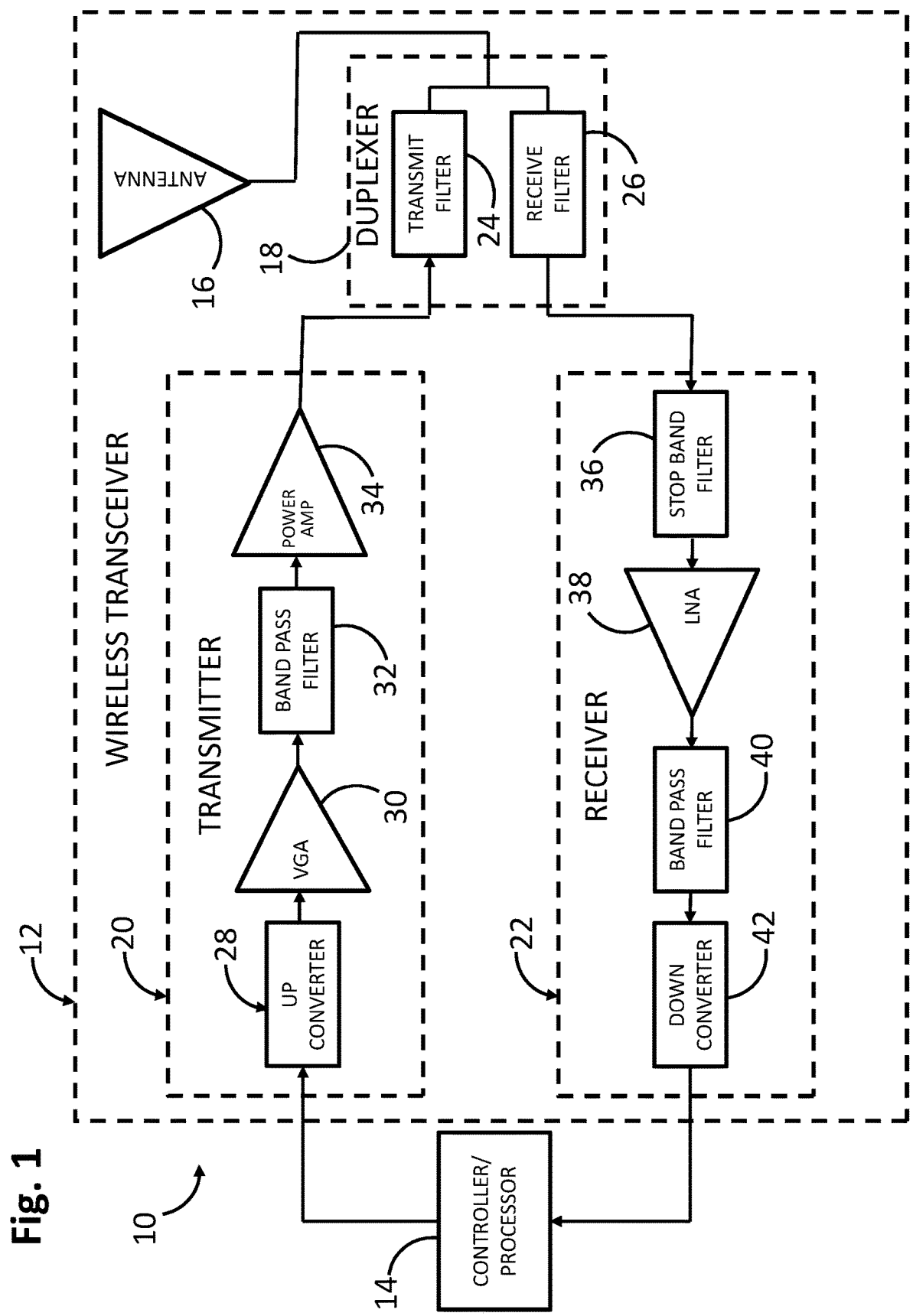
FIG. 1 is a block diagram of a wireless telecommunications system.

The present disclosure describes a technique for designing acoustic wave (AW) microwave filters (such as surface acoustic wave (SAW), bulk acoustic wave (BAW), film bulk acoustic resonator (FBAR), microelectromechanical system (MEMS) filters)). This technique can be applied to AW microwave filters in the 300 MHz to 300 GHz frequency range, particularly in the 300 MHz to 10.0 GHz frequency range, and even more particularly in the 500 MHz to 3.5 GHz frequency range. Such AW microwave filters may be either fixed frequency and/or tunable filters (tunable in frequency and/or bandwidth and/or input impedance and/or output impedance), and may be used for single band or multiple bandpass and/or bandstop filtering. Such AW microwave filters are advantageous in applications that have demanding electrical and/or environmental performance requirements and/or severe cost/size constraints, such as those found in the radio frequency (RF) front ends of mobile communications devices, including cellphones, smartphones, laptop computers, tablet computers, etc. or the RF front ends of fixed communications devices, including M2M devices, wireless base stations, satellite communications systems, etc.

Example AW microwave filters described herein exhibit a frequency response with a single passband, which is particularly useful in telecommunication system duplexers. For example, with reference to FIG. 1, a telecommunications system 10 for use in a mobile communications device may include a transceiver 12 capable of transmitting and receiving wireless signals, and a controller/processor 14 capable of controlling the functions of the transceiver 12. The transceiver 12 generally comprises a broadband antenna 16, a duplexer 18 having a transmit filter 24 and a receive filter 26, a transmitter 20 coupled to the antenna 16 via the transmit filter 24 of the duplexer 18, and a receiver 22 coupled to the antenna 16 via the receive filter 26 of the duplexer 18.

The transmitter 20 includes an upconverter 28 configured for converting a baseband signal provided by the controller/processor 14 to a radio frequency (RF) signal, a variable gain amplifier (VGA) 30 configured for amplifying the RF signal, a bandpass filter 32 configured for outputting the RF signal at an operating frequency selected by the controller/processor 14, and a power amplifier 34 configured for amplifying the filtered RF signal, which is then provided to the antenna 16 via the transmit filter 24 of the duplexer 18.

The receiver 22 includes a notch or stopband filter 36 configured for rejecting transmit signal interference from the RF signal input from the antenna 16 via the receiver filter 26, a low noise amplifier (LNA) 38 configured for amplifying the RF signal from the stop band filter 36 with a relatively low noise, a bandpass filter 40 configured for outputting the amplified RF signal at a frequency selected by the controller/processor 14, and a downconverter 42 configured for downconverting the RF signal to a baseband signal that is provided to the controller/processor 14. Alternatively, the function of rejecting transmit signal interference performed by the stop-band filter 36 can instead be performed by the duplexer 18. Or, the power amplifier 34 of the transmitter 20 can be designed to reduce the transmit signal interference.

It should be appreciated that the block diagram illustrated in FIG. 1 is functional in nature, and that several functions can be performed by one electronic component or one function can be performed by several electronic components. For example, the functions performed by the up converter 28, VGA 30, bandpass filter 40, downconverter 42, and controller/processor 14 are oftentimes performed by a single transceiver chip. The function of the bandpass filter 32 can be performed by the power amplifier 34 and the transmit filter 24 of the duplexer 18.

The exemplary technique described herein is used to design acoustic microwave filters for the front-end of the telecommunications system 10, and in particular the transmit filter 24 of the duplexer 18, although the same technique can be used to design acoustic microwave filters for the receive filter 26 of the duplexer 18 and for other RF filters.

Figure 2:
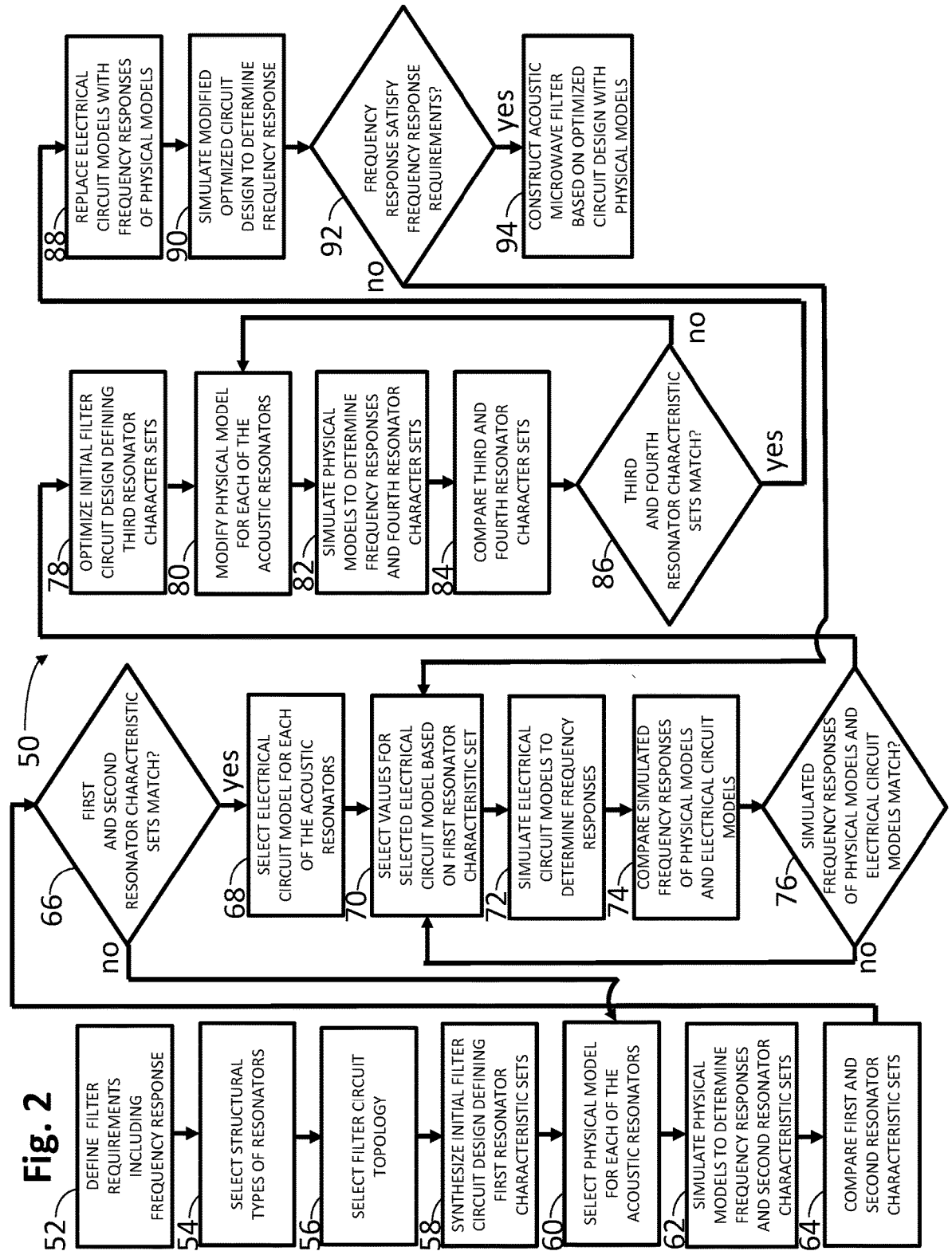
FIG. 2 is a flow diagram of a technique used to design a microwave acoustic filter for use in the wireless telecommunications system of FIG. 3.

Referring now to FIG. 2, one exemplary technique 50 for designing an AW microwave filter will be described. First, the filter requirements, which comprise the frequency response requirements (including passband, return loss, insertion loss, rejection, linearity, noise figure, input and output impedances, etc.), as well as size and cost requirements, and environmental requirements, such as operating temperature range, vibration, failure rate, etc., are define by the application of the filter (step 52).

Next, the structural types of circuit elements to be used in the AW filter are selected; for example, the structural type of resonator (SAW, BAW, FBAR, MEMS, etc.) and the types of inductor, capacitor, and switch, along with the materials to be used to fabricate these circuit elements, including the packaging and assembly techniques for fabricating the filter, are selected (step 54). For example, SAW resonators may be selected, which may be fabricated by disposing interdigital transducers (IDTs) on a piezoelectric substrate, such as crystalline Quartz, Lithium Niobate ($LiNbO_3$), Lithium Tantalate ($LiTaOs_3$) crystals or BAW (including FBAR) resonators or MEMS resonators. In the particular example described herein, the selection of circuit element types are SAW resonators and capacitors constructed on a substrate composed of 42-degree XY-cut LiTaO3.

Figure 3:
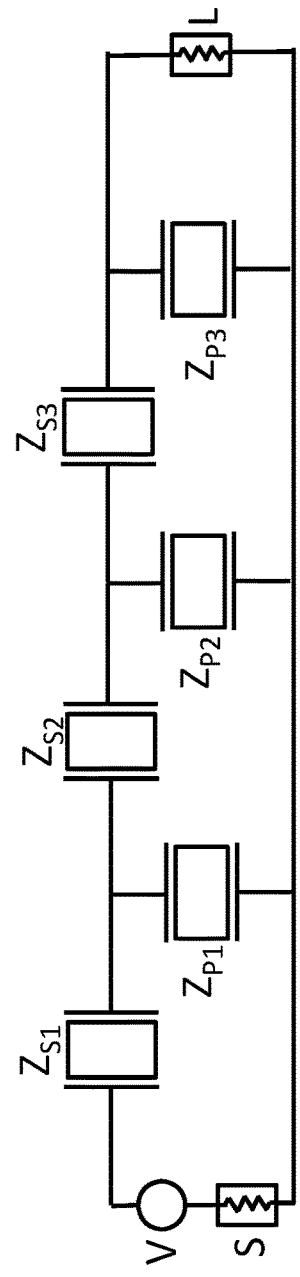
FIG. 3 is a schematic diagram of a microwave acoustic filter arranged in an Nth order ladder topology.

Then, a filter circuit topology is selected (step 56). In the embodiment illustrated in FIG. 3, the selected filter circuit topology is an Nth order ladder topology (in this case, N=6 meaning the number of resonators equals 6). The filter circuit topology 100 comprises a source resistance S, a load resistance L, three series (or in-line) acoustic resonators $Z_{S1}$-$Z_{S3}$, and three parallel (or in-shunt) acoustic resonators $Z_{P1}$-$Z_{P3}$. Nth order ladder topologies are described in U.S. Pat. Nos. 8,751,993 and 8,701,065 and U.S. patent application Ser. No. 14/941,451, entitled "Acoustic Wave Filter with Enhanced Rejection", which are all expressly incorporated herein by reference. Other filter circuit topologies, such as in-line non-resonant-node, or in-line, or in-line with cross couplings, or in-line non-resonant node with cross couplings, etc., may be selected.

Then, a modeled filter circuit design having a plurality of circuit elements that includes at least one acoustic resonator is generated. In particular, an initial filter circuit design is synthesized using suitable filter circuit design techniques, resulting in the definition of values for all of the circuit elements, including a first set of resonator characteristics (e.g., a static capacitance, resonant frequency, and gamma) for each of the acoustic resonators Z (step 58). Next, an initial physical model of each of the acoustic resonators Z is selected; for example, by selecting a material, one or more of a number of finger pairs, aperture size, mark-to-pitch ratio, and/or transducer metal thickness (step 60); and each of the initial physical models of the acoustic resonators Z is iteratively simulated and modified until they match the initial filter circuit design, thereby generating the modeled filter circuit design. In particular, each of the initial physical models of the acoustic resonators Z is simulated (e.g., using a Finite Element Model (FEM)) to determine frequency response and a second set of resonator characteristics (e.g., the static capacitance and resonant frequency) for each of the physical acoustic models (step 62).

The second set of resonator characteristics of each of the physical acoustic models is then respectively compared to the first set of resonator characteristics of each of the acoustic resonators Z defined in step 58 (step 64). If the first and second sets of resonator characteristics do not match each other (step 66), another physical model of each of the acoustic resonators Z is selected; for example, by modifying a material, one or more of a number of finger pairs, aperture size, mark-to-pitch ratio, and/or transducer metal thickness (step 60), and steps 62-66 are repeated.

Figure 4:
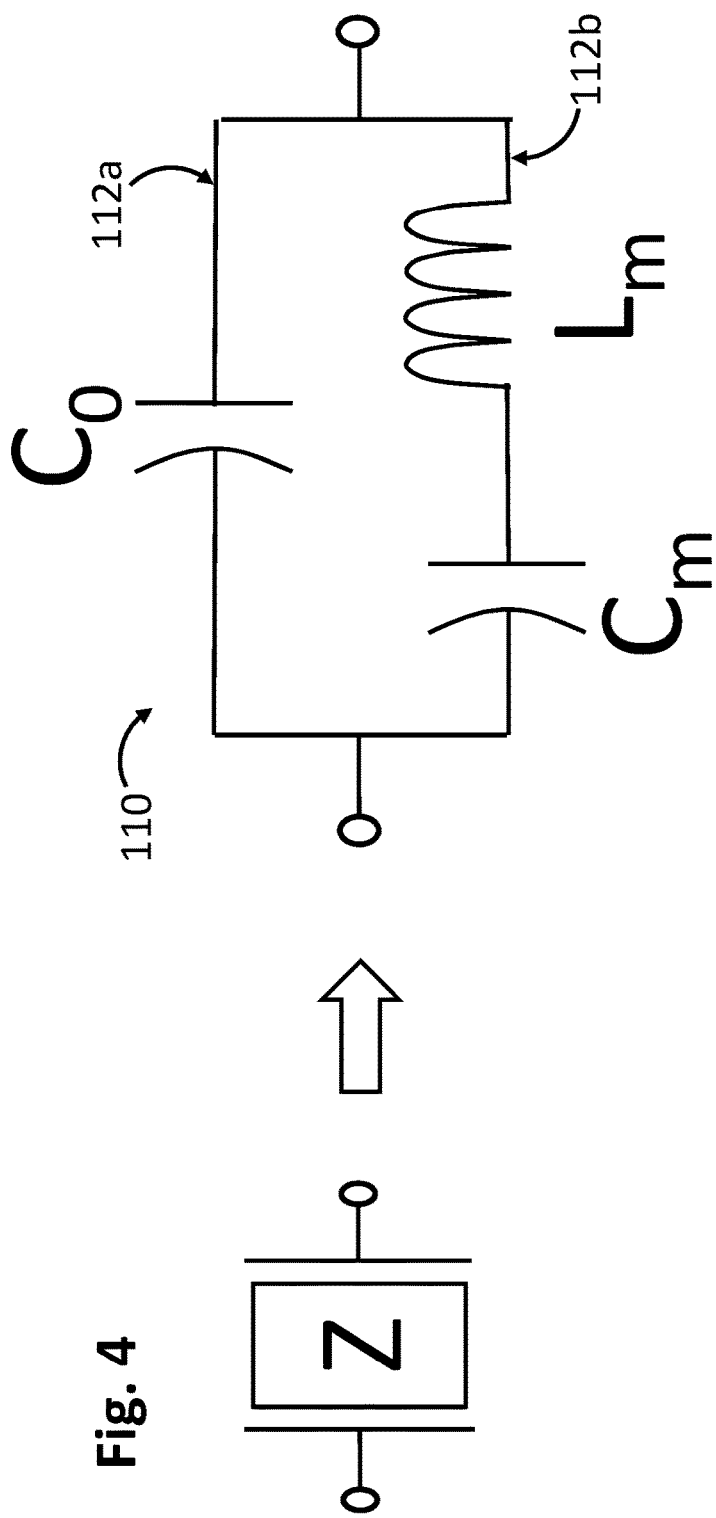
FIG. 4 is a schematic diagram illustrating the transformation of an acoustic resonator of the acoustic filter of FIG. 3 into an equivalent Butterworth-Van Dyke (BVD) model.

If the first and second sets of resonator characteristics do match each other (step 66), an electrical circuit model, such as a modified Butterworth-Van Dyke (MBVD) model, is selected for each of the acoustic resonators $Z_{P1}$-$Z_{P4}$ (step 68). The basic electrical circuit for a MBVD is the BVD model illustrated in FIG. 4. The BVD model 110 comprises a parallel static branch 112a and a parallel motional branch 112b. The parallel static branch 112a includes a static capacitance $C_0$, and the parallel motional branch 112b includes a motional capacitance $C_m$ and a motional inductance $L_m$. The motional capacitance $C_m$ and motional inductance $L_m$ may result from the interactions of electrical and acoustical behavior, and thus, may be referred to as the motional arm of the BVD model 110. The static capacitance $C_0$ may result from the capacitance of the structure, and thus, may be referred to as the static (non-motional) capacitance of the BVD model 110.

Various MBVD models can be derived from the basic BVD model 110 for use in modeling each of the acoustic resonators Z in the initial filter circuit design 100.

Figure 5A:
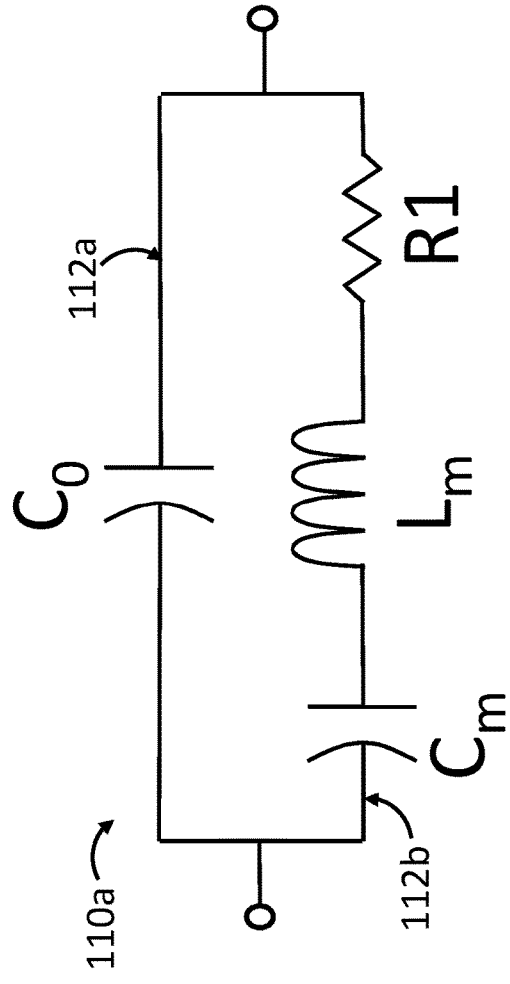
FIG. 5a is a schematic diagram illustrating one equivalent modified Butterworth-Van Dyke (MBVD) model into which the acoustic resonators of the acoustic filter of FIG. 3 can be transformed.

For example, as illustrated in FIG. 5a, one MBVD model 110a comprises the parallel static branch 112a, the parallel motional branch 112b, and a resistance R1 located in the parallel motional branch 112b in series with the motional capacitance $C_m$ and a motional inductance $L_m$. The resistance R1 represents the loss caused from the electrical resistance of the acoustic resonator.

Figure 5B:
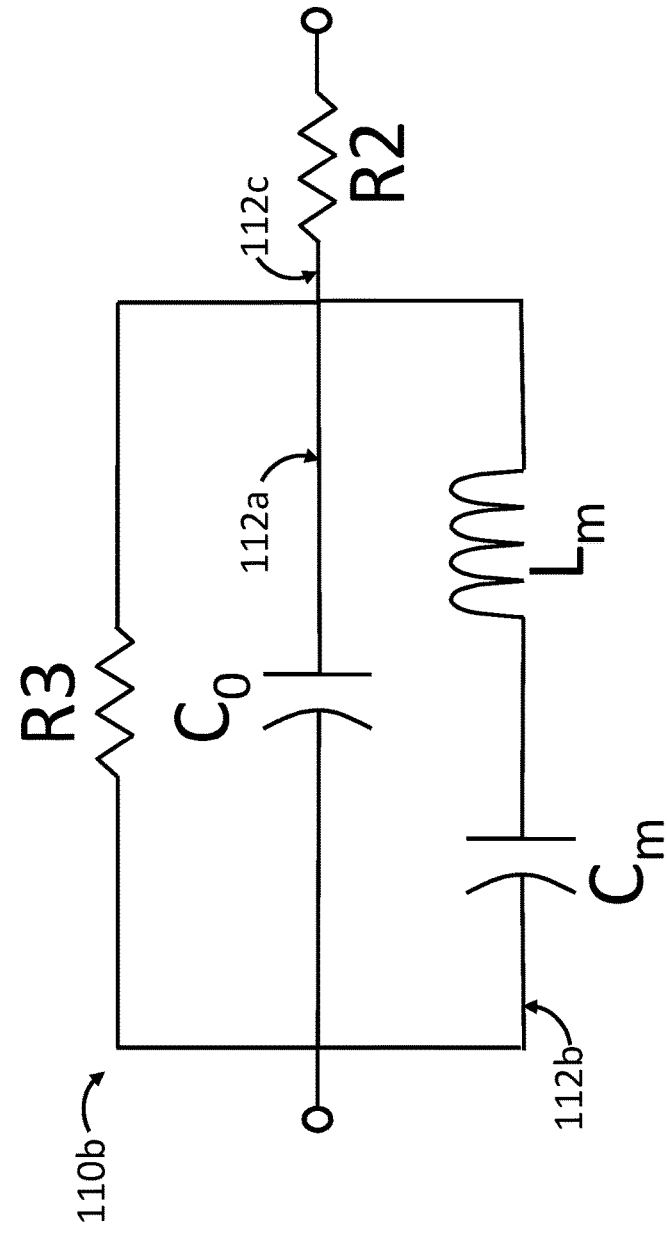
FIG. 5b is a schematic diagram illustrating another equivalent modified Butterworth-Van Dyke (MBVD) model into which the acoustic resonators of the acoustic filter of FIG. 3 can be transformed.

In another example illustrated in FIG. 5b, an MBVD model 110b comprises the parallel static branch 112a, the parallel motional branch 112b, a resistance R2 located in a main branch 112c, and a resistance R3 located in parallel with the static capacitance $C_0$. The resistances R2 and R3 represent the losses caused from the electrical resistance of the acoustic resonator.

Figure 5C:
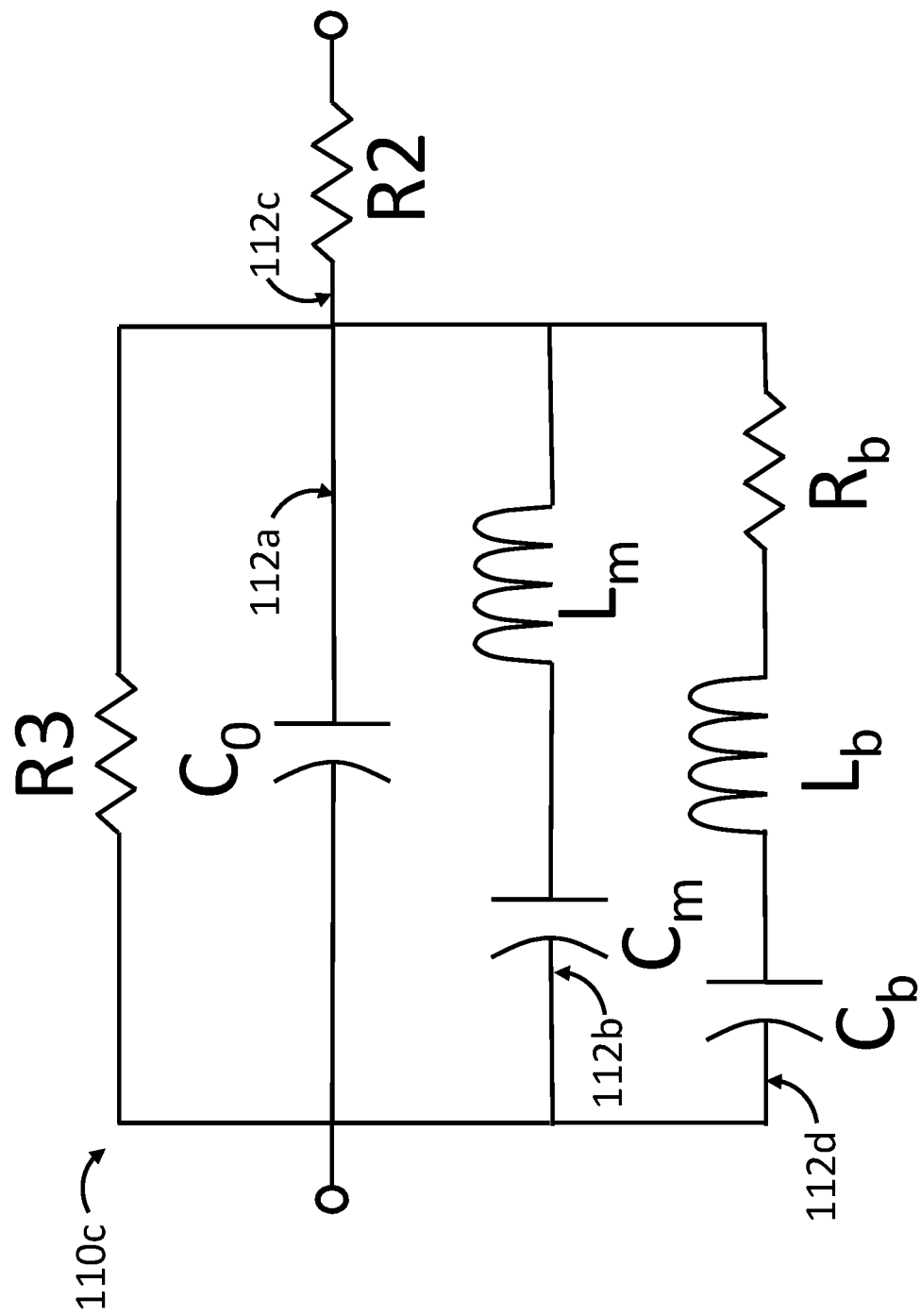
FIG. 5c is a schematic diagram illustrating still another equivalent modified Butterworth-Van Dyke (MBVD) model into which the acoustic resonators of the acoustic filter of FIG. 3 can be transformed.

In still another example illustrated in FIG. 5c, an MBVD model 110c comprises the parallel static branch 112a, the parallel motional branch 112b, the resistances R2 and R3, and a parallel Bragg Band branch 112d that includes a resistance $R_b$, an inductance $L_b$, and a capacitance $C_b$. The Bragg Band branch 112d models the upper Bragg Band discontinuity of the acoustic resonator.

Figure 5D:
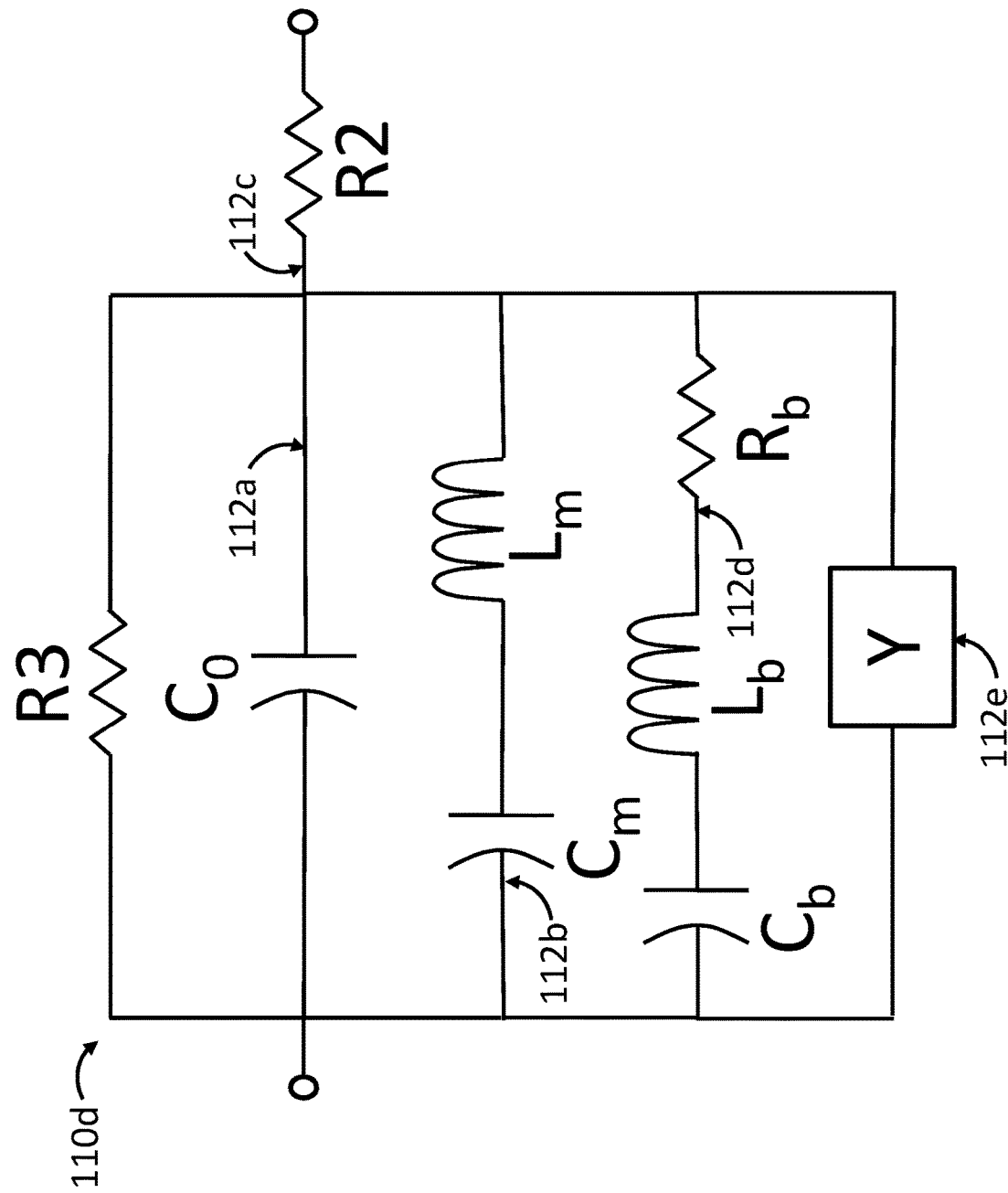
FIG. 5d is a schematic diagram illustrating yet another equivalent modified Butterworth-Van Dyke (MBVD) model into which the acoustic resonators of the acoustic filter of FIG. 3 can be transformed.

In yet another example illustrated in FIG. 5d, an MBVD model 110d comprises the parallel static branch 112a, the parallel motional branch 112b, the resistances R1 and R2, the parallel Bragg Band branch 112d, and a parallel bulk mode function 112e that models an acoustic bulk mode loss. The bulk bode function 112e is a hyperbolic tangent function, which in the illustrated embodiment, is computed in accordance with the following equation:

$$Y = h * \left(1 - \frac{1}{10^{\left(\frac{freq}{w(10^6 - F_b)} + 1\right)}}\right), \quad [5]$$

where Y is the bulk mode loss in dB; h is a scaling factor used to match the loss of the bulk mode; $F_b$ is a frequency in Hz used to match the onset frequency of the bulk mode, w is a scaling factor used to match the steepness of the onset of the bulk mode, and freq is the frequency of the input signal.

A SAW resonator was fabricated and modeled using the different electrical circuit models 110a-110d created in accordance with the equations [1]-[3]. Various types of frequency responses of the fabricated acoustic resonator were measured and simulated with the different electrical circuit models 110a-110d. As illustrated in FIGS. 6-9, the resonant frequency 120, anti-resonant frequency 122, upper Bragg Band frequency 124, and Bulk Mode range 126 of the frequency responses of the respective electrical circuit models 110a-110d can be compared to each other relative to the measured frequency responses of the fabricated acoustic resonator.

In particular, the measurement of the fabricated acoustic resonator and the simulated MBVD models 110a-110d respectively yielded the s-parameter (S11 return loss) frequency responses plotted on a Smith Chart over a frequency range from below the resonant frequency of the SAW resonator to above the upper Bragg Band of the SAW resonator (FIGS. 6a, 7a, 8a, and 9a); the y-parameter frequency responses plotted in decibels over a frequency range from below the resonant frequency of the SAW resonator to above the upper Bragg Band of the SAW resonator (FIGS. 6b, 7b, 8b, and 9b); the real part of the y-parameter frequency responses plotted in Siemens over a frequency range centered around the resonant frequency of the SAW resonator (FIGS. 6c, 7c, 8c, and 9c); the real part of the z-parameter frequency responses plotted in ohms over a frequency range centered around the anti-resonant frequency of the SAW resonator (FIGS. 6d, 7d, 8d, and 9d); the real part of the y-parameter frequency responses plotted in Siemens over a frequency range from above the resonant frequency of the SAW resonator to above the upper Bragg Band of the SAW resonator (FIGS. 6e, 7e, 8e, and 9e); and the s-parameter (S11 return loss) frequency responses plotted over a frequency range centered on the upper Bragg Band frequency of the SAW resonator (FIGS. 6f, 7f, 8f, and 9f).

Figure 6A:
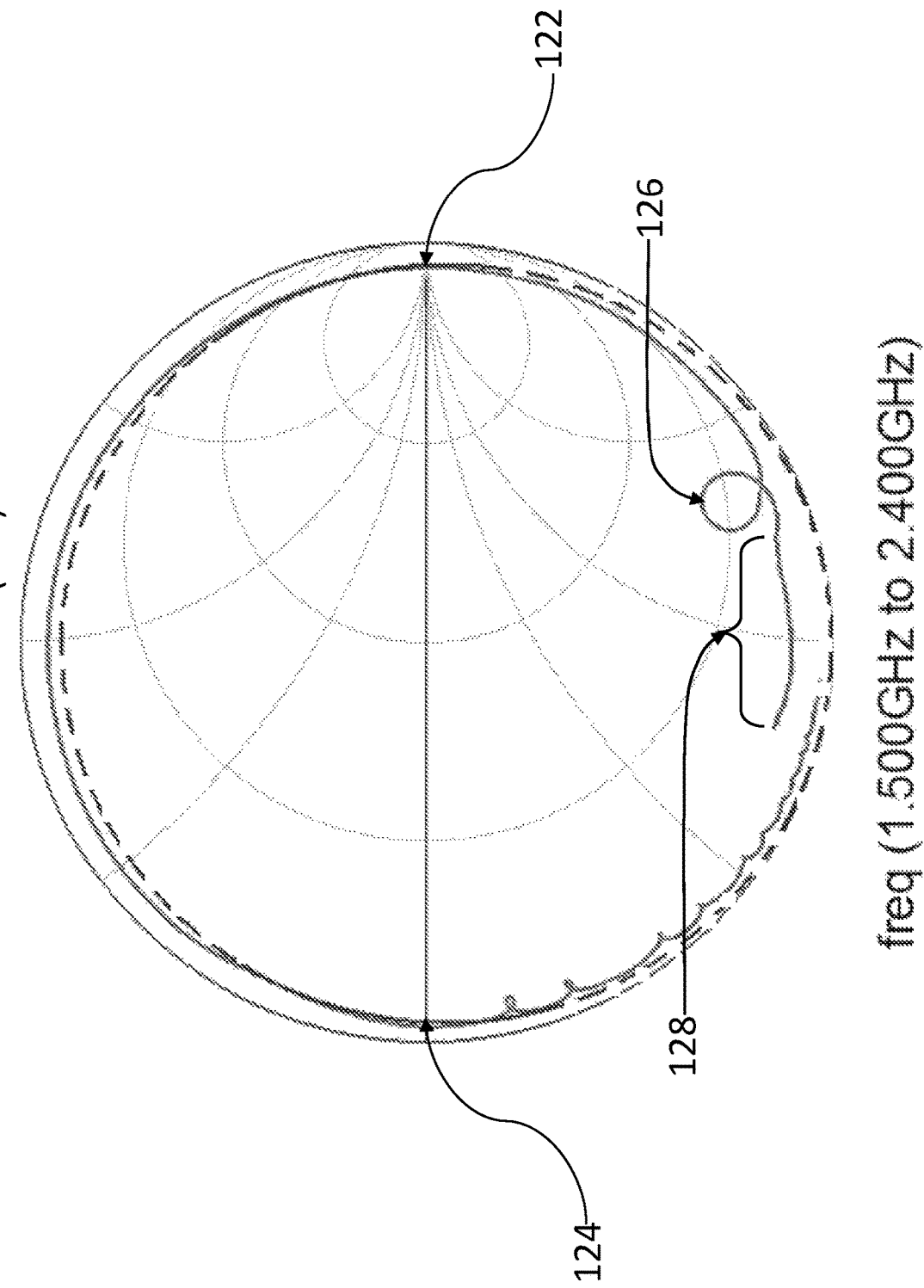
FIG. 6a is a measured s-parameter frequency response of an actual acoustic resonator and a simulated s-parameter frequency response of the equivalent MBVD model of FIG. 5a plotted against each other on a Smith Chart.
Figure 6B:
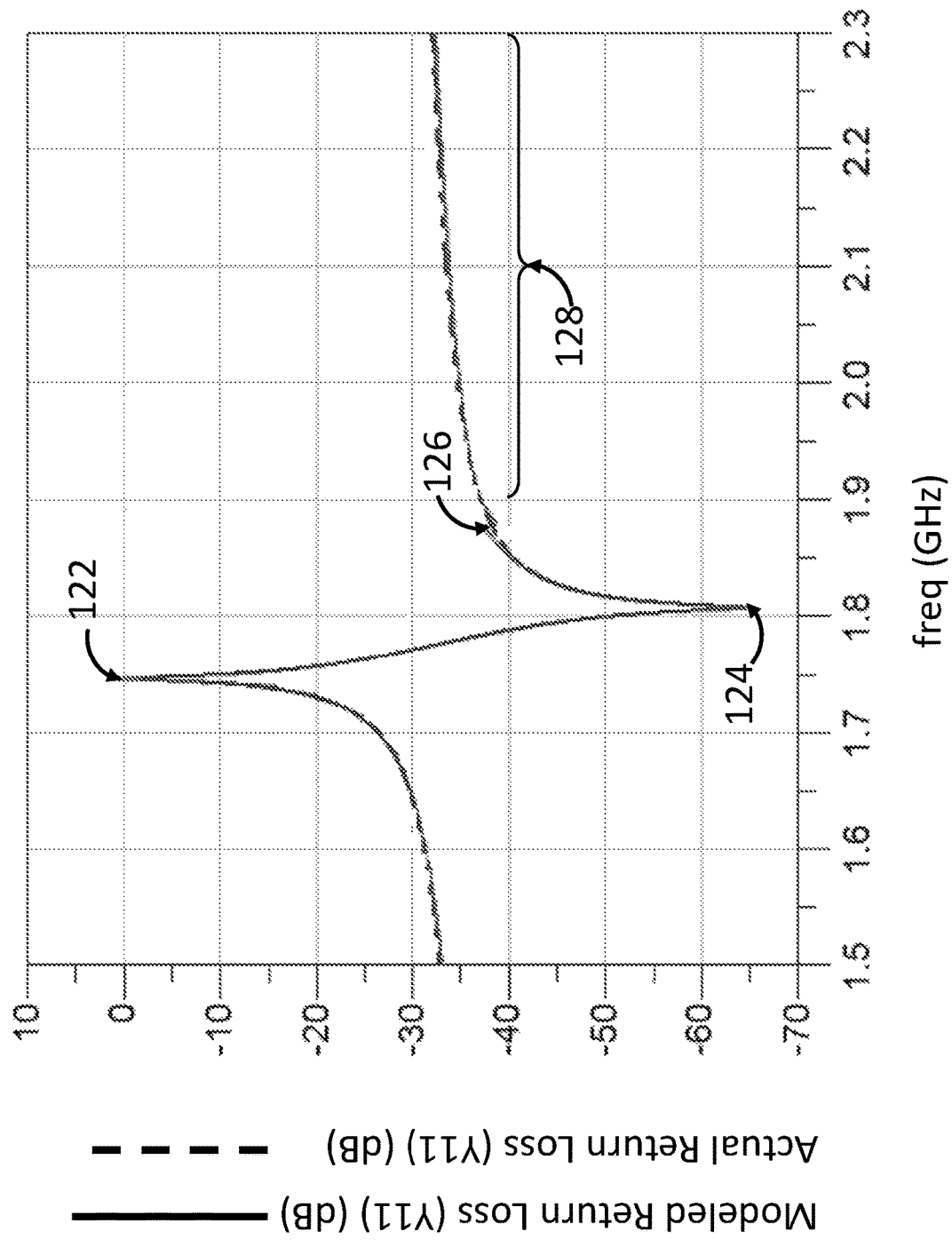
FIG. 6b is a measured y-parameter frequency response of an actual acoustic resonator and a simulated y-parameter frequency response of the equivalent MBVD model of FIG. 5a plotted against each other from below the resonant frequency to above the upper Bragg Band frequency.
Figure 6F:
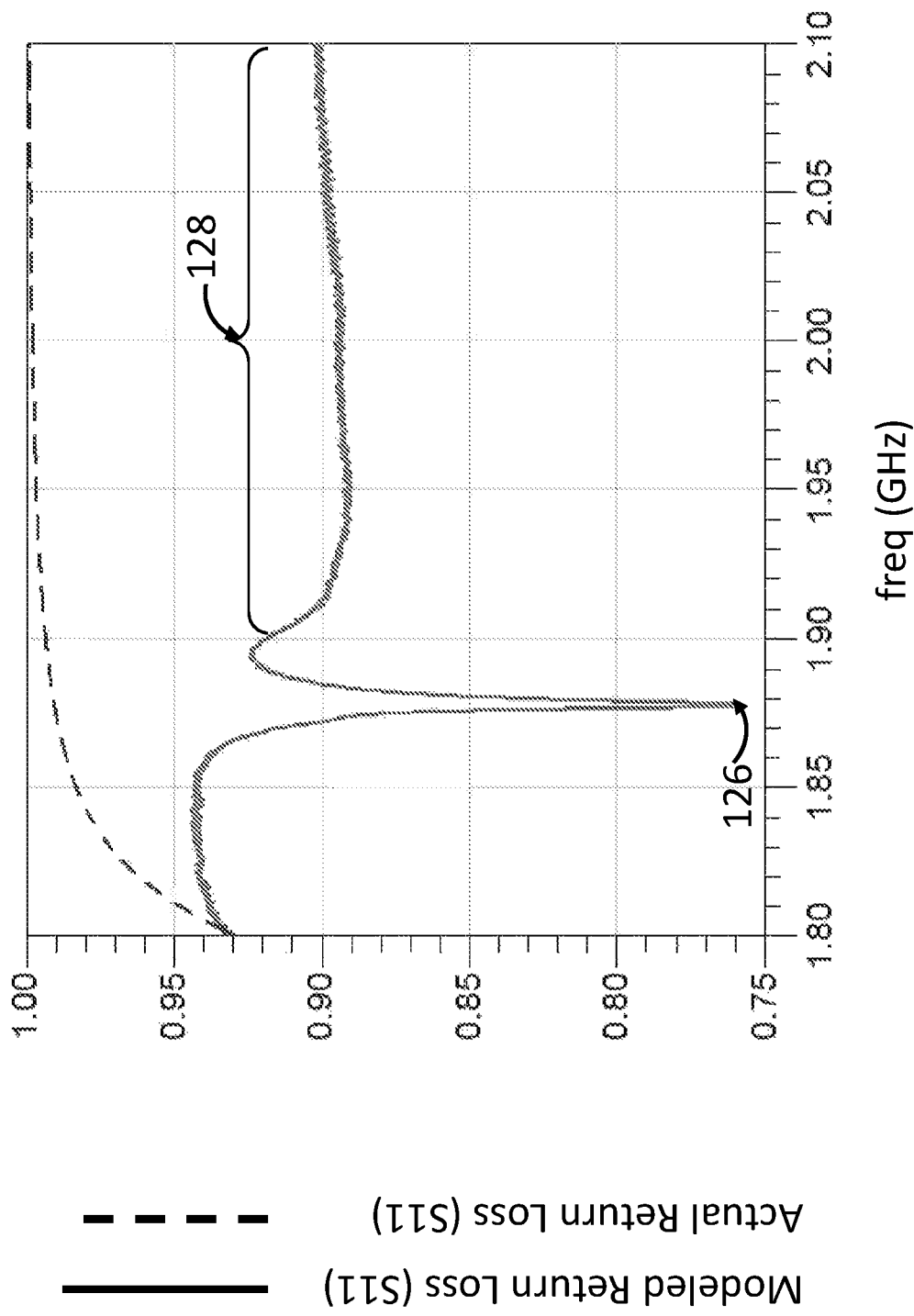
FIG. 6f is a measured real portion of a s-parameter frequency response of an actual acoustic resonator and a simulated real portion of a s-parameter frequency response of the equivalent MBVD model of FIG. 5a plotted against each other from below the upper Bragg Band frequency to above the upper Bragg Band frequency.

The single-component loss model of the electrical circuit model 110a (i.e., resistor R1 in FIG. 5a) does not exactly match the actual electrical loss of the fabricated acoustic resonator, resulting in substantial differences between the simulated frequency response and measured frequency response in terms of the resonant frequency 120 and anti-resonant frequency 122, as shown in the plots of FIGS. 6c and 6d. The absence of a Bragg band branch and bulk mode function in the electrical circuit model 110a results in even larger differences between the simulated frequency response and measured frequency response in terms of the upper Bragg Band frequency 124 and Bulk Mode range 126, as shown in the plots of FIGS. 6a, 6e, and 6f.

Figure 7B:
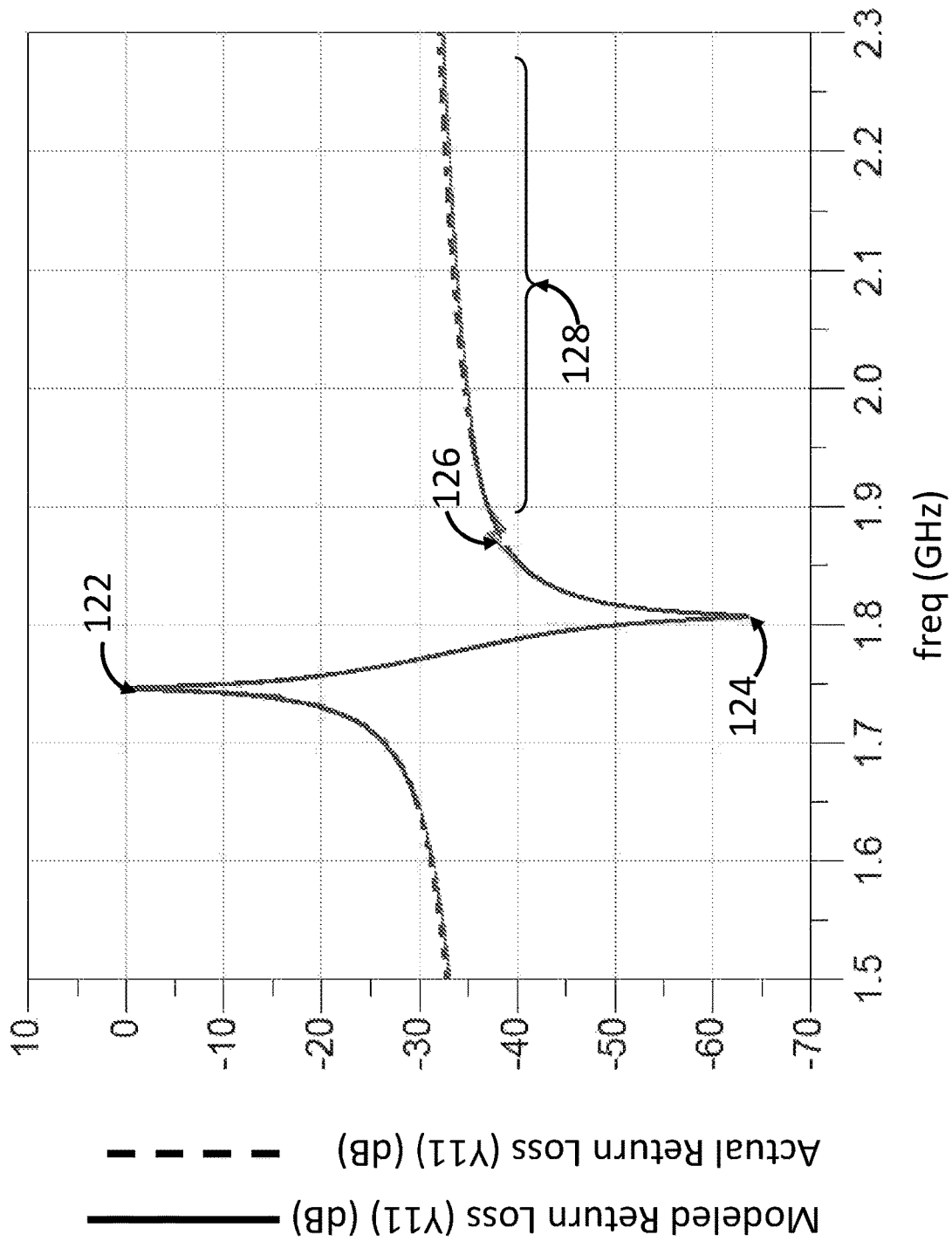
FIG. 7b is a measured y-parameter frequency response of an actual acoustic resonator and a simulated y-parameter frequency response of the equivalent MBVD model of FIG. 5b plotted against each other from below the resonant frequency to above the upper Bragg Band frequency.
Figure 7C:
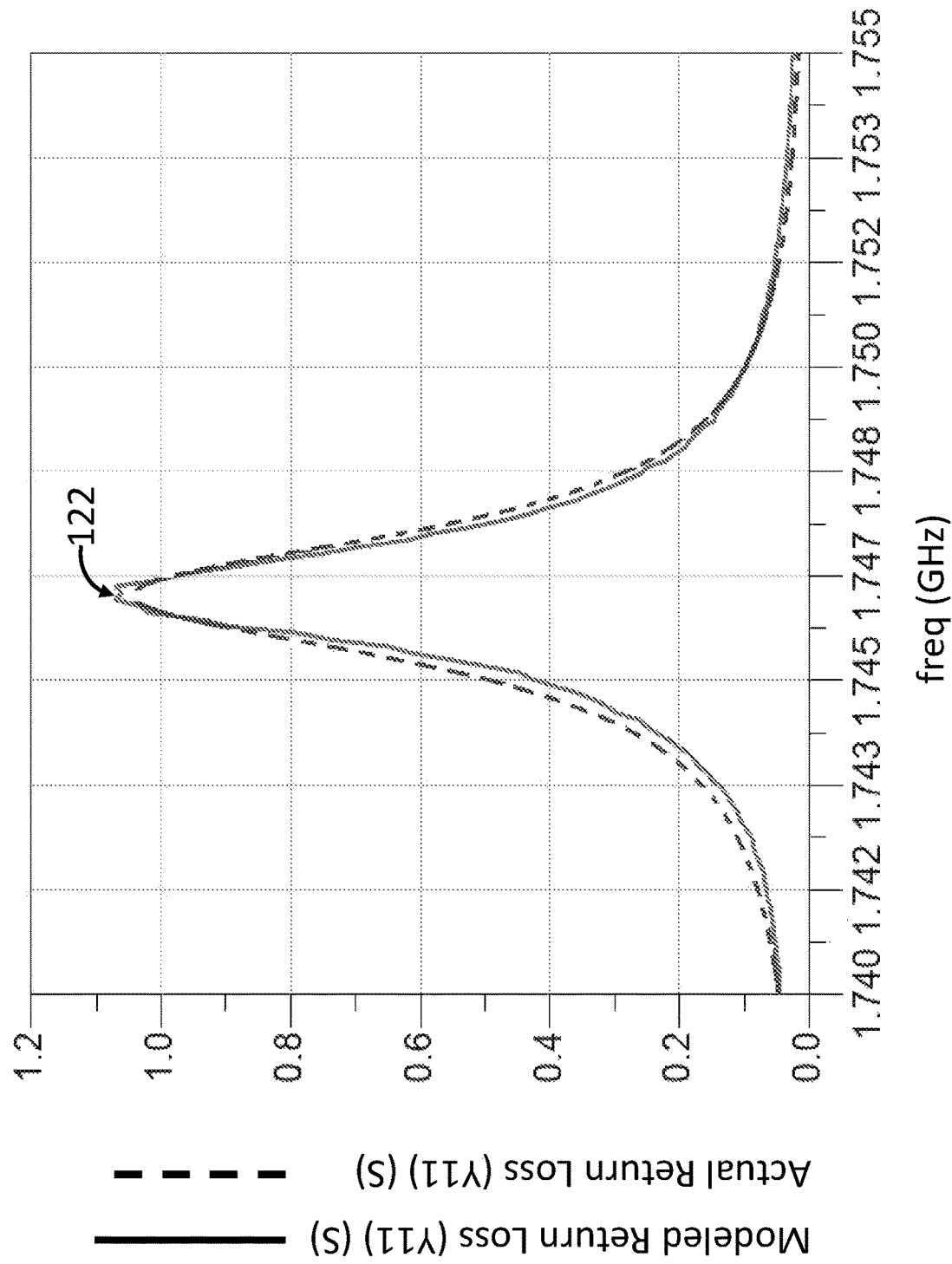
FIG. 7c is a measured real portion of a y-parameter frequency response of an actual acoustic resonator and a simulated real portion of a y-parameter frequency response of the equivalent MBVD model of FIG. 5b plotted against each other from below the resonant frequency to above the resonant frequency.
Figure 7D:
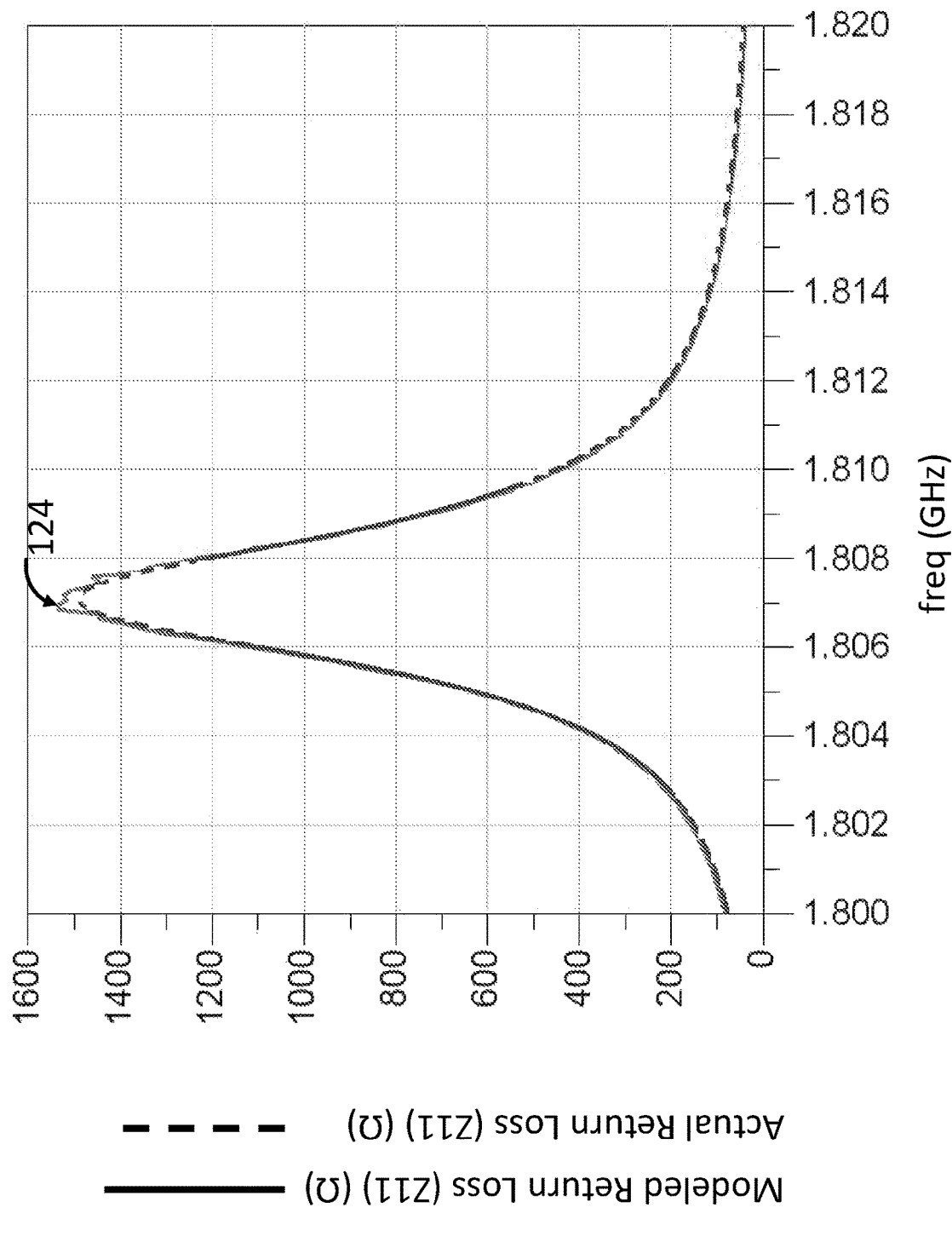
FIG. 7d is a measured real portion of a z-parameter frequency response of an actual acoustic resonator and a simulated real portion of a z-parameter frequency response of the equivalent MBVD model of FIG. 5b plotted against each other from below the anti-resonant frequency to above the anti-resonant frequency.
Figure 7E:
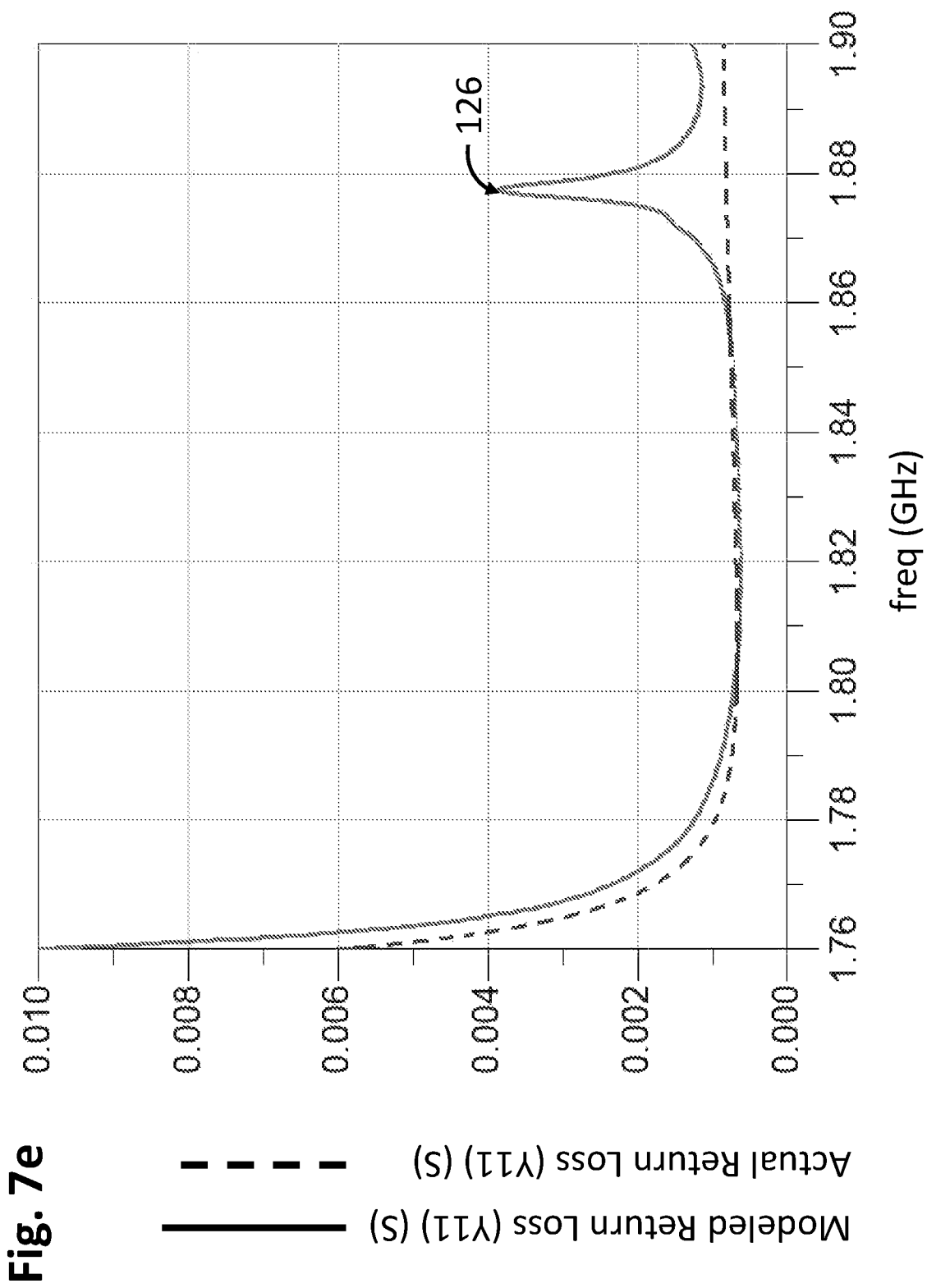
FIG. 7e is a measured real portion of a y-parameter frequency response of an actual acoustic resonator and a simulated real portion of a y-parameter frequency response of the equivalent MBVD model of FIG. 5b plotted against each other from above the resonant frequency to above the upper Bragg Band frequency.
Figure 7F:
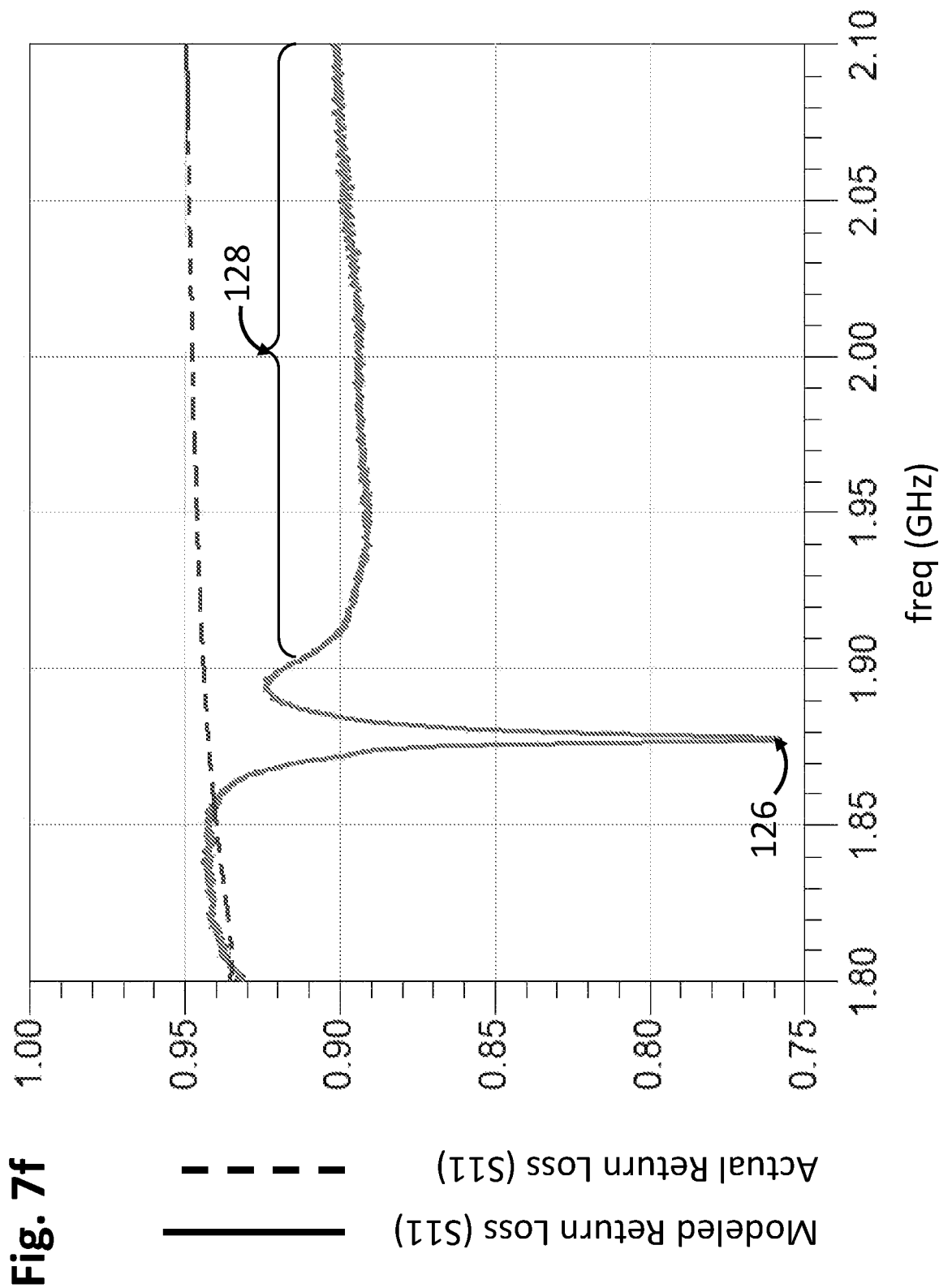
FIG. 7f is a measured real portion of a s-parameter frequency response of an actual acoustic resonator and a simulated real portion of a s-parameter frequency response of the equivalent MBVD model of FIG. 5b plotted against each other from below the upper Bragg Band frequency to above the upper Bragg Band frequency.

In contrast, compared to the single-component loss model of the electrical circuit model 110a, the two-component loss model of the electrical circuit model 110b (i.e., resistors R2 and R3 in FIG. 5b) better matches the actual electrical loss of the fabricated acoustic resonator, resulting in insubstantial differences between the simulated frequency response and measured frequency response in terms of the resonant frequency 120 and anti-resonant frequency 122, as shown in the plots of FIGS. 7c and 7d. However, like the electrical circuit model 110a, the absence of a Bragg band branch and bulk mode function in the electrical circuit model 110b results in large differences between the simulated frequency response and measured frequency response in terms of the upper Bragg Band frequency 124 and Bulk Mode range 126, as shown in the plots of FIGS. 7a, 7e, and 7f.

Figure 8B:
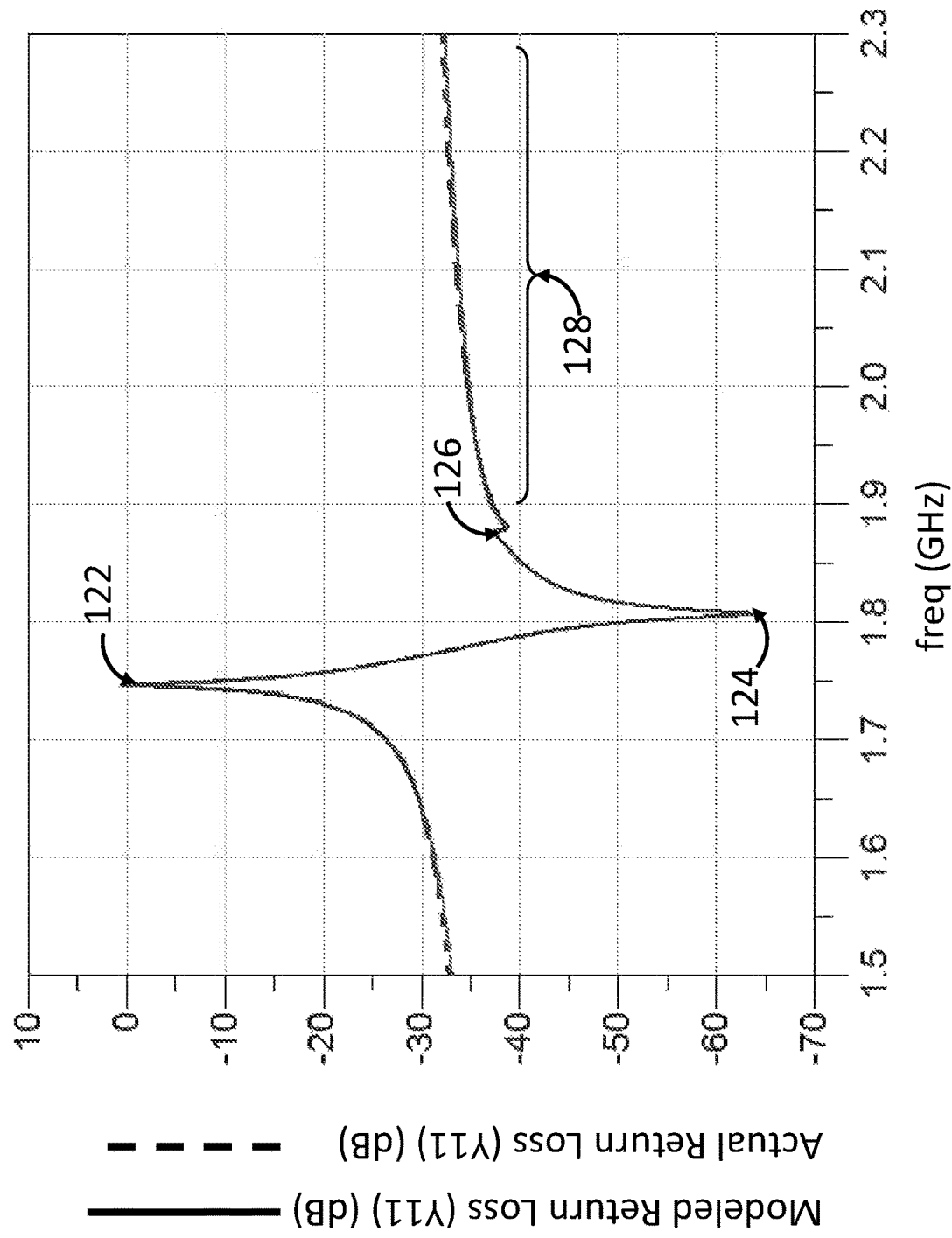
FIG. 8b is a measured y-parameter frequency response of an actual acoustic resonator and a simulated y-parameter frequency response of the equivalent MBVD model of FIG. 5c plotted against each other from below the resonant frequency to above the upper Bragg Band frequency.
Figure 8C:
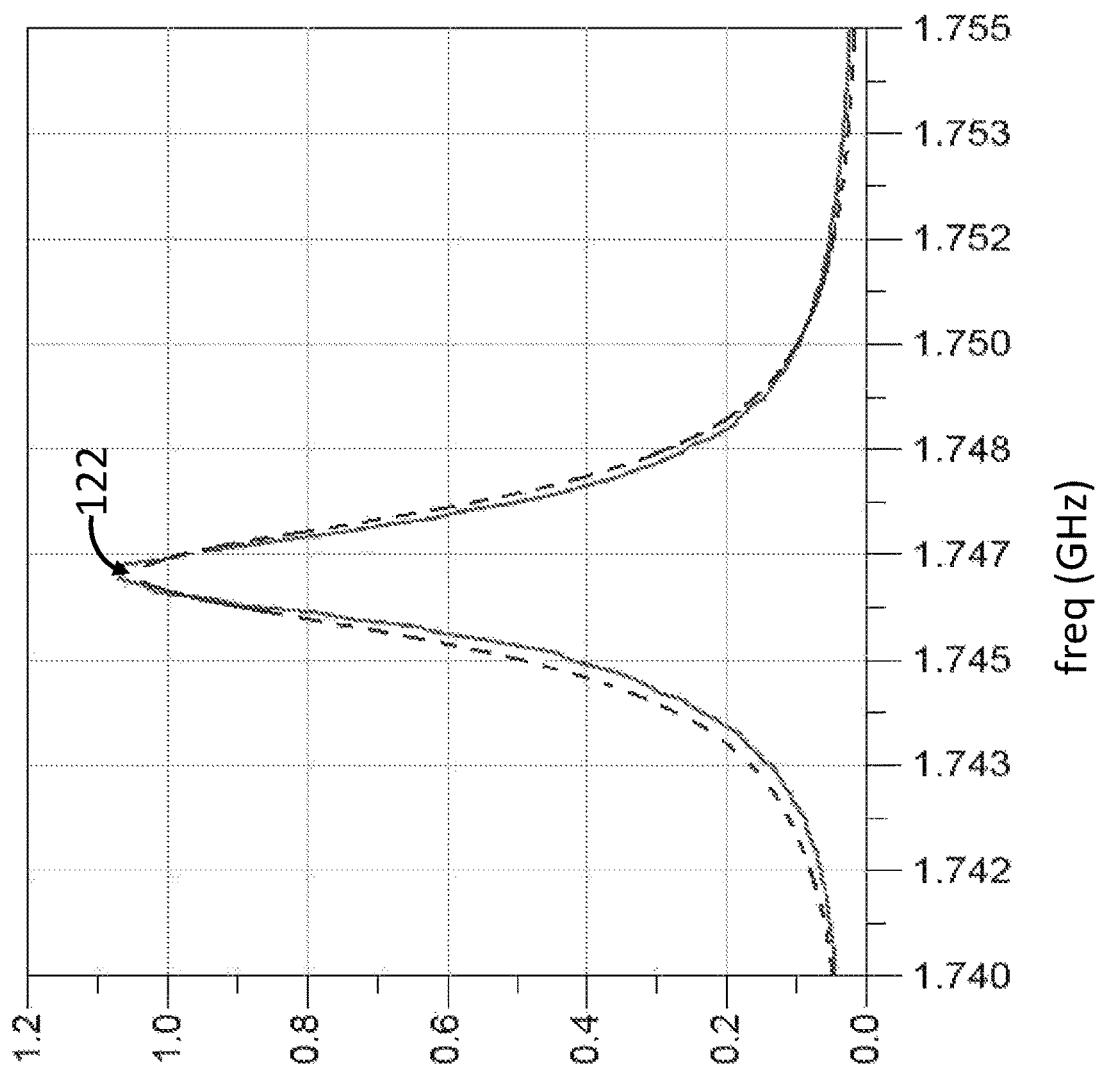
FIG. 8c is a measured real portion of a y-parameter frequency response of an actual acoustic resonator and a simulated real portion of a y-parameter frequency response of the equivalent MBVD model of FIG. 5c plotted against each other from below the resonant frequency to above the resonant frequency.
Figure 8D:
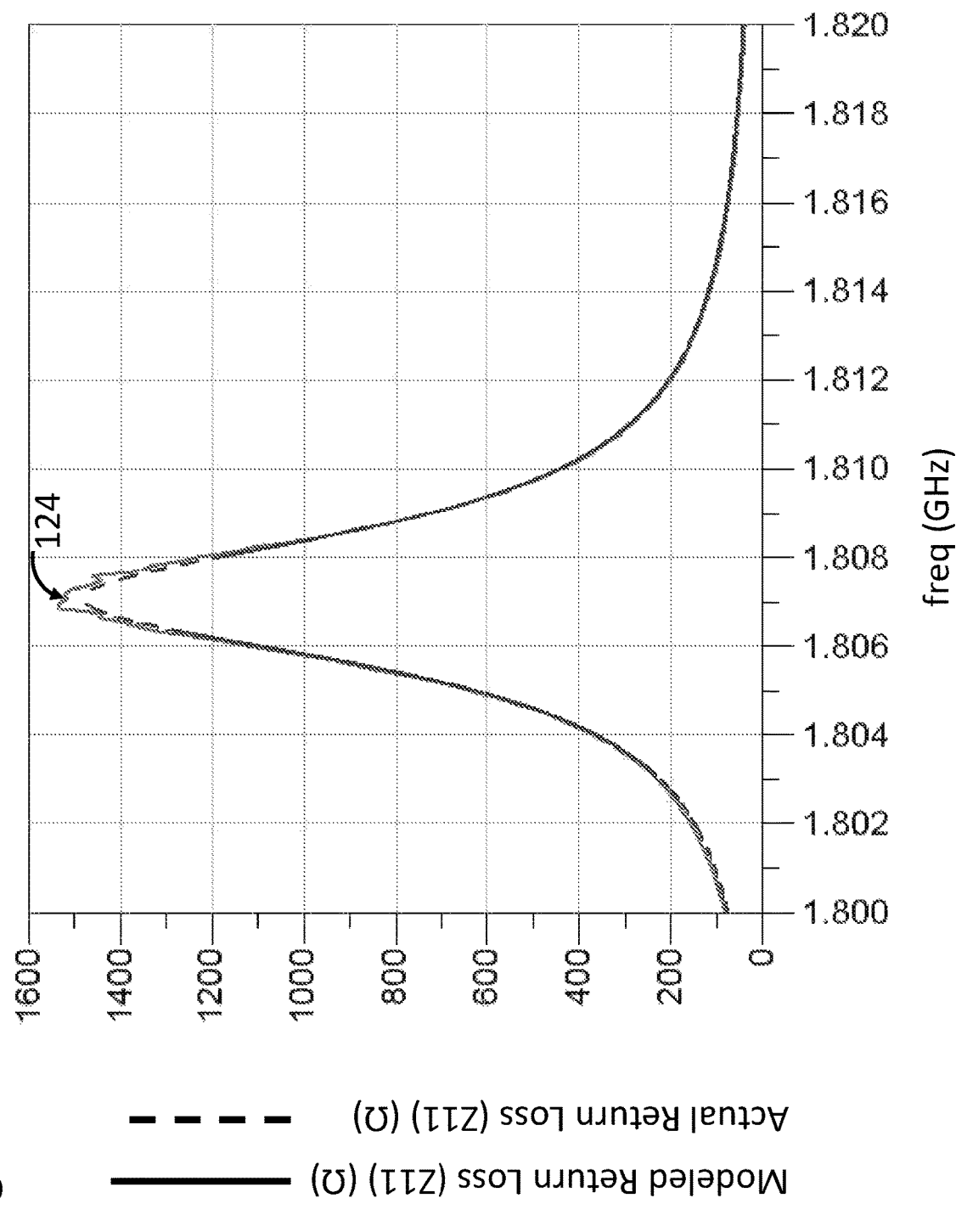
FIG. 8d is a measured real portion of a z-parameter frequency response of an actual acoustic resonator and a simulated real portion of a z-parameter frequency response of the equivalent MBVD model of FIG. 5c plotted against each other from below the anti-resonant frequency to above the anti-resonant frequency.
Figure 8E:
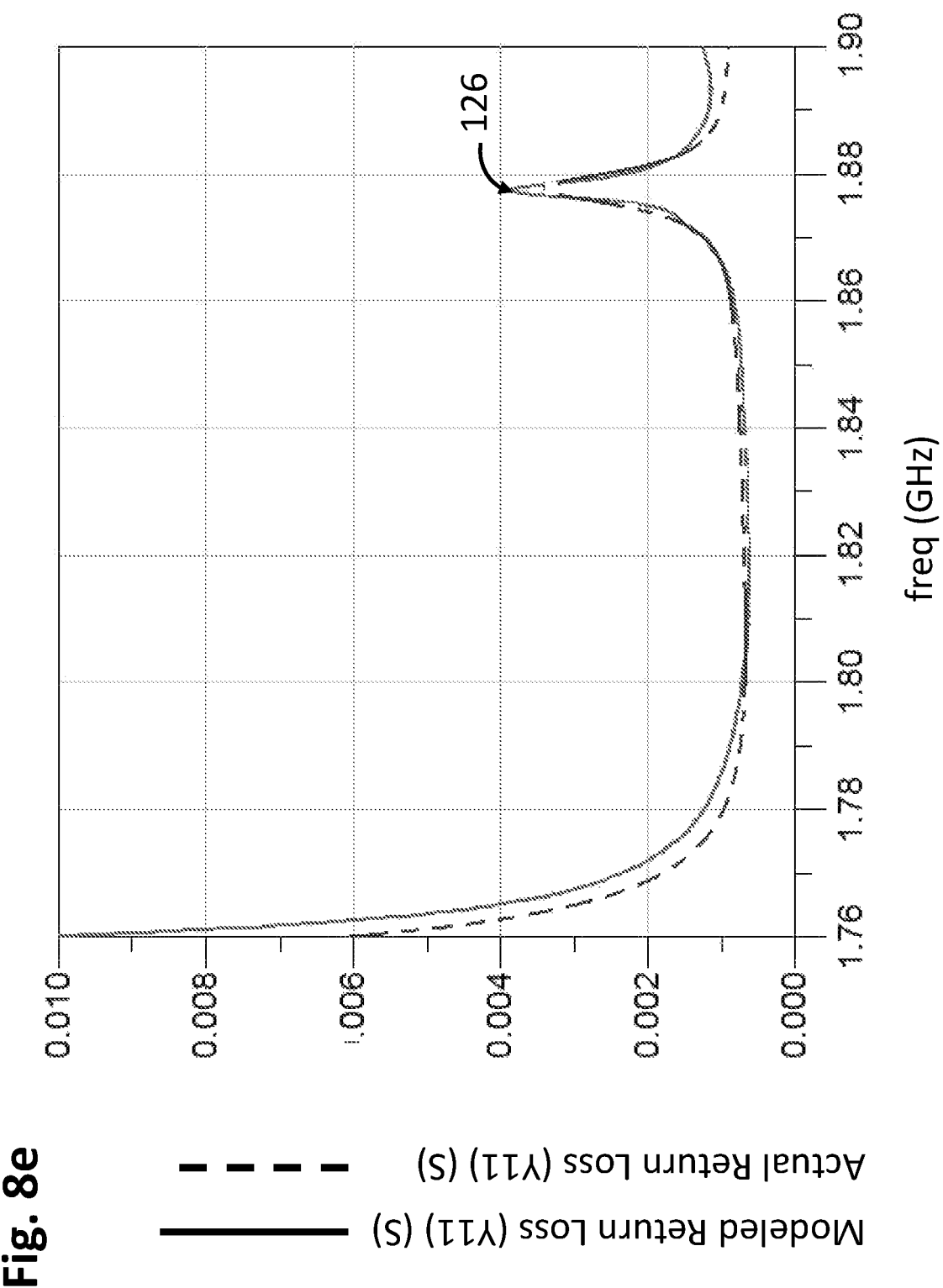
FIG. 8e is a measured real portion of a y-parameter frequency response of an actual acoustic resonator and a simulated real portion of a y-parameter frequency response of the equivalent MBVD model of FIG. 5c plotted against each other from above the resonant frequency to above the upper Bragg Band frequency.

Like the two-component loss model of the electrical circuit model 110b, the two-component loss model of the electrical circuit model 110c (i.e., resistors R2 and R3 in FIG. 5c) matches the actual electrical loss of the fabricated acoustic resonator, resulting in insubstantial differences between the simulated frequency response and measured frequency response in terms of the resonant frequency 120 and anti-resonant frequency 122, as shown in the plots of FIGS. 8c and 8d. In contrast to the electrical circuit model 110b, the additional Bragg Band branch 112d of the electrical circuit model 110c (FIG. 5c) substantially matches the upper Bragg Band discontinuity of the fabricated acoustic resonator, resulting in insubstantial differences between the simulated frequency response and measured frequency response in terms of the upper Bragg band frequency 124, as shown in the plots of FIGS. 8a and 8e. However, like the electrical circuit model 110b, the absence of a bulk mode function in the electrical circuit model 110c results in large differences between the simulated frequency response and measured frequency response in terms of the Bulk Mode range 126, as shown in the plots of FIG. 8f.

Figure 9A:
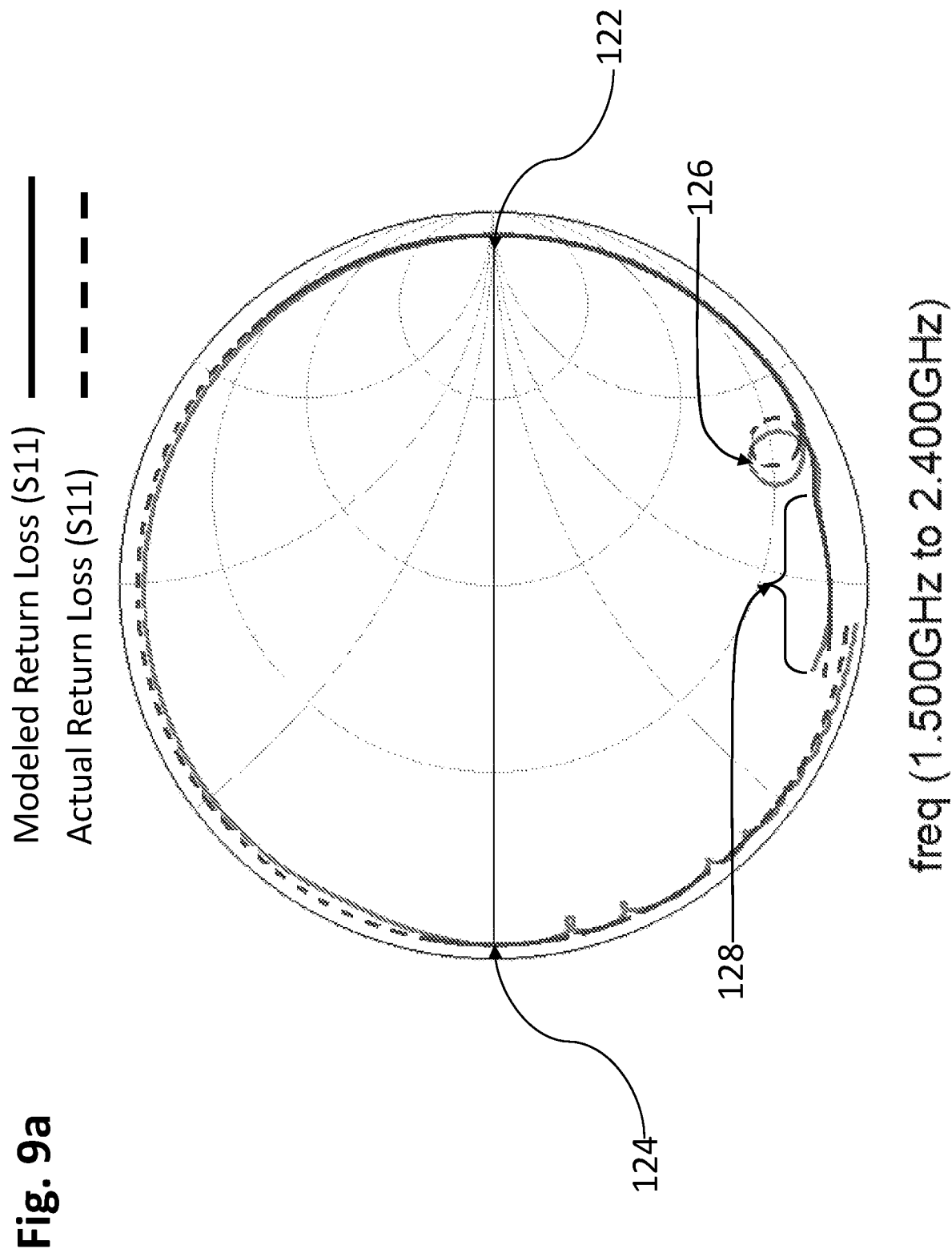
FIG. 9a is a measured s-parameter frequency response of an actual acoustic resonator and a simulated s-parameter frequency response of the equivalent MBVD model of FIG. 5d plotted against each other on a Smith Chart.
Figure 9B:
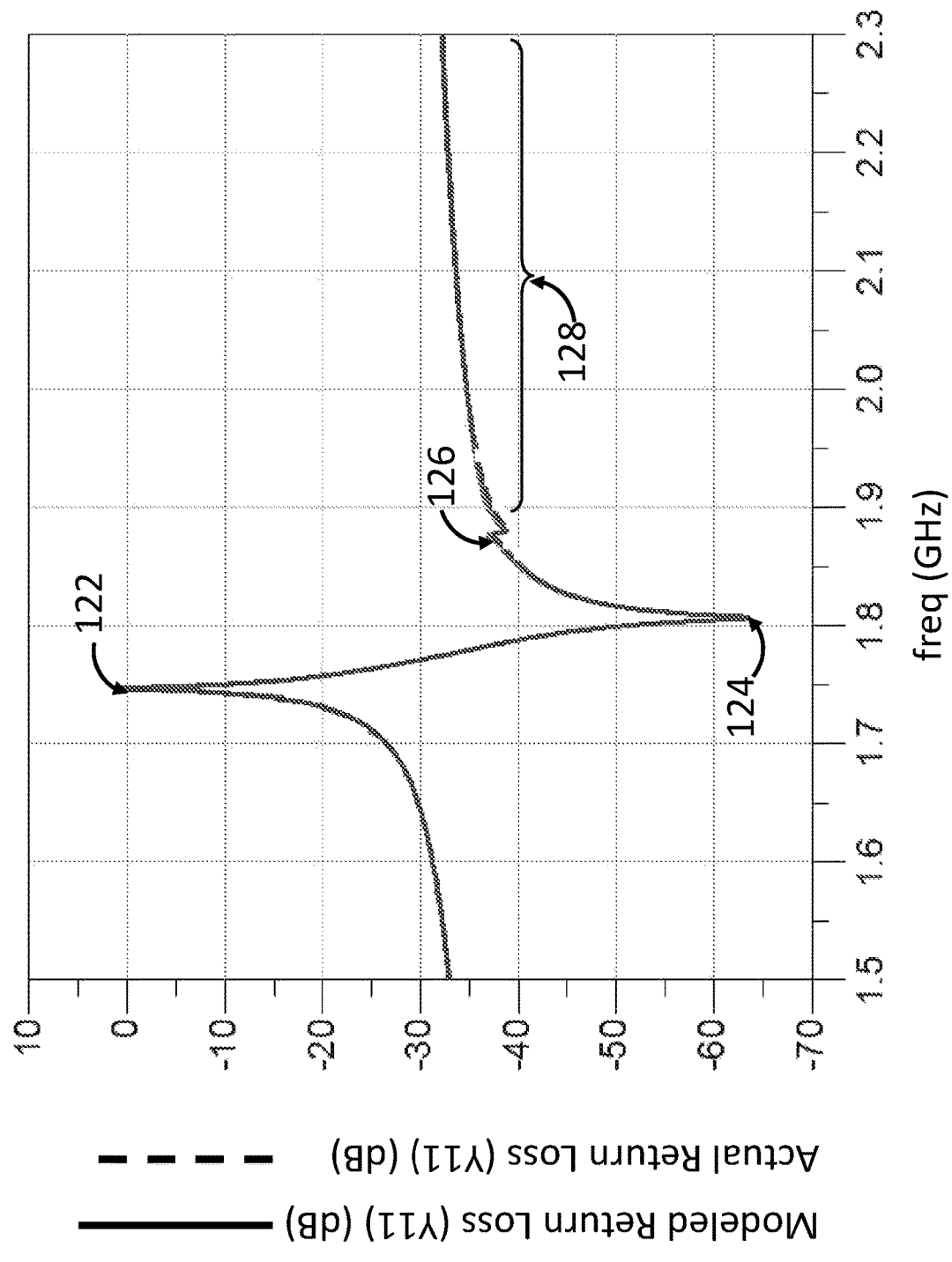
FIG. 9b is a measured y-parameter frequency response of an actual acoustic resonator and a simulated y-parameter frequency response of the equivalent MBVD model of FIG. 5d plotted against each other from below the resonant frequency to above the upper Bragg Band frequency.
Figure 9C:
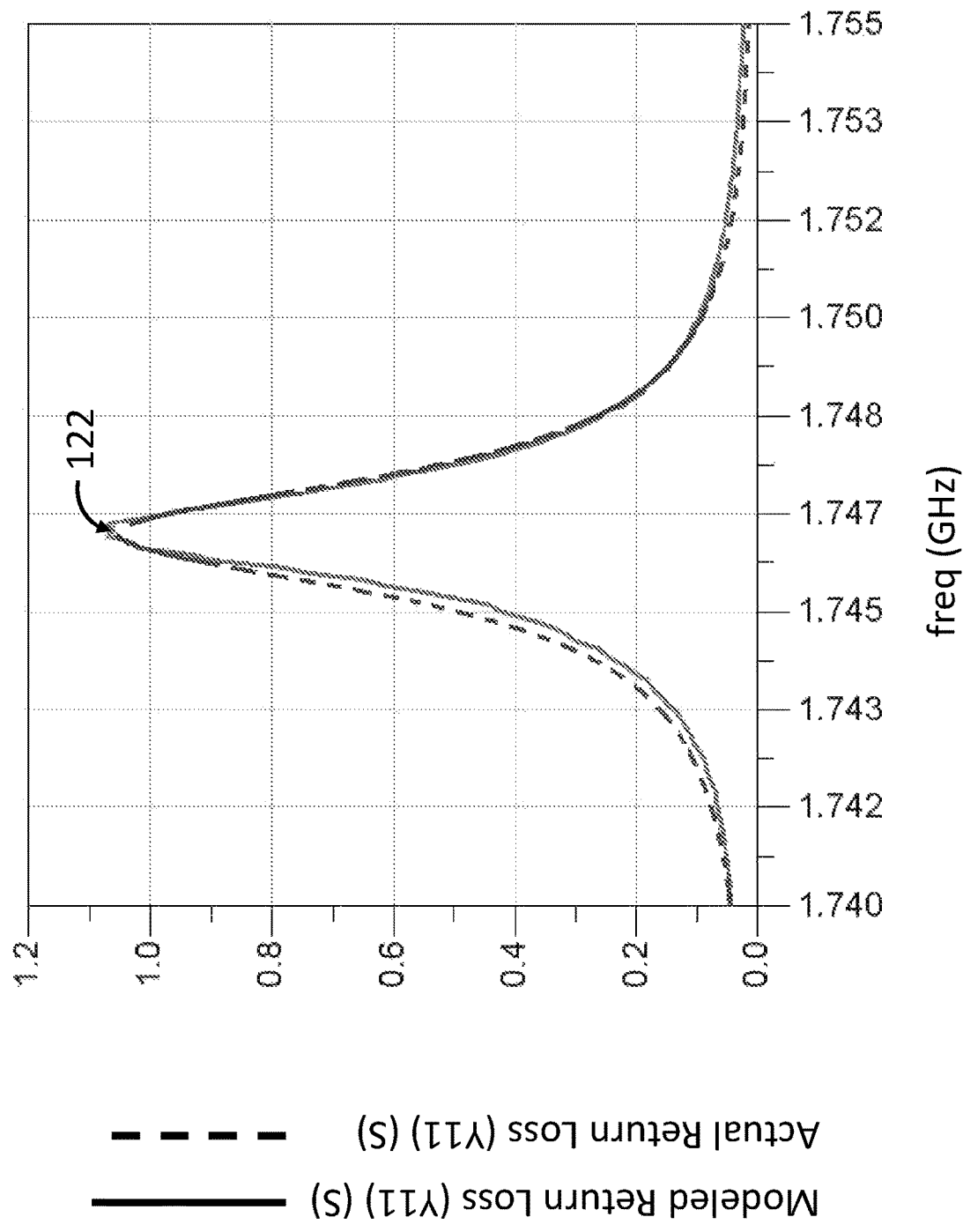
FIG. 9c is a measured real portion of a y-parameter frequency response of an actual acoustic resonator and a simulated real portion of a y-parameter frequency response of the equivalent MBVD model of FIG. 5d plotted against each other from below the resonant frequency to above the resonant frequency.
Figure 9D:
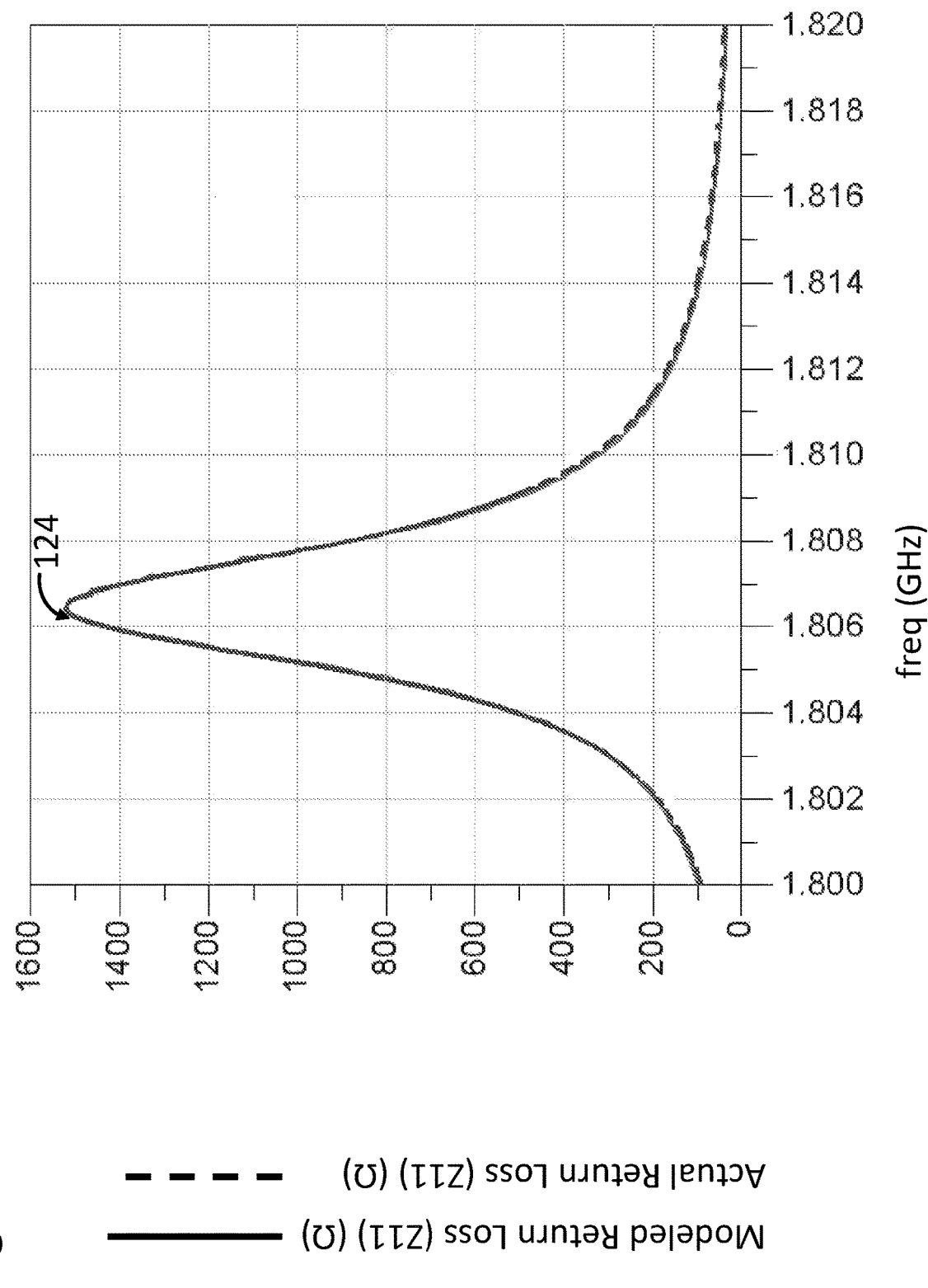
FIG. 9d is a measured real portion of a z-parameter frequency response of an actual acoustic resonator and a simulated real portion of a z-parameter frequency response of the equivalent MBVD model of FIG. 5d plotted against each other from below the anti-resonant frequency to above the anti-resonant frequency.
Figure 9E:
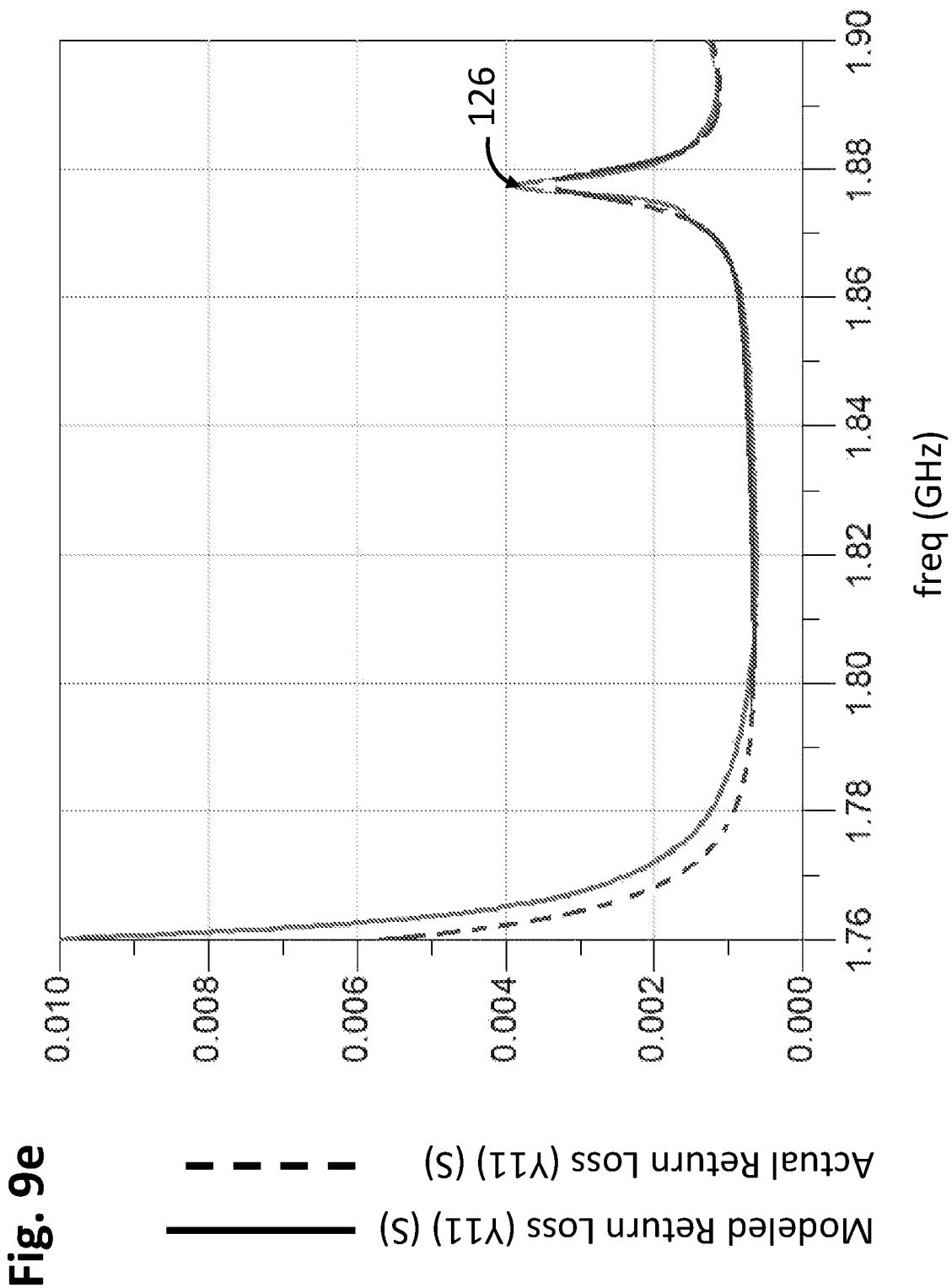
FIG. 9e is a measured real portion of a y-parameter frequency response of an actual acoustic resonator and a simulated real portion of a y-parameter frequency response of the equivalent MBVD model of FIG. 5d plotted against each other from above the resonant frequency to above the upper Bragg Band frequency.

Like the two-component loss model of the electrical circuit model 110c, the two-component loss model of the electrical circuit model 110c (i.e., resistors R2 and R3 in FIG. 5d) matches the actual electrical loss of the fabricated acoustic resonator, resulting in insubstantial differences between the simulated frequency response and measured frequency response in terms of the resonant frequency 120 and anti-resonant frequency 122, as shown in the plots of FIGS. 9c and 9d. Also like the electrical circuit model 110c, the Bragg Band branch 112d of the electrical circuit model 110d (FIG. 5d) substantially matches the upper Bragg Band discontinuity of the fabricated acoustic resonator, resulting in insubstantial differences between the simulated frequency response and measured frequency response in terms of the upper Bragg band frequency 124, as shown in the plots of FIGS. 9a and 9e. In contrast to the electrical circuit model 110c, the additional Bulk Mode function 112e substantially matches the Bulk Mode loss of the fabricated acoustic resonator, resulting in insubstantial differences between the simulated frequency response and measured frequency response in terms of the Bulk Mode range 126, as shown in the plot of FIG. 8f.

After the electrical circuit model (e.g., one of the MBVD models 110a-110d) is selected for each of the acoustic resonators Z at step 68, the electrical circuit models are fitted to the physical acoustic models, thereby generating the modeled filter circuit design; that is, the electrical circuit models are iteratively simulated and modified until they respectively match the physical models of the acoustic resonators Z. In particular, values for the circuit elements in each of the electrical circuit models are selected based on the values of the first set of resonator characteristics (e.g., static capacitance, resonant frequency, and gamma) selected for the initial filter circuit design in step 58 (step 70).

Notably, the circuit values of the selected MBVD model 110 are related by the following equations:

$$\omega_R = \frac{1}{\sqrt{L_m C_m}}; \quad [1]$$

$$\frac{\omega_A}{\omega_R} = \sqrt{1 + \frac{1}{\gamma}}, \quad [2]$$

where $\omega_R$ and $\omega_A$ may be the respective resonance and anti-resonance frequencies for any given acoustic resonator, and gamma $\gamma$ may depend on a material's property, which may be further defined by:

$$\frac{C_0}{C_m} = \gamma. \quad [3]$$

Typical $\gamma$ values may range from about 12 to about 18 for 42-degree X Y cut $LiTaO_3$. The frequency separation of an acoustic resonator means the difference between its resonant frequency and its anti-resonant frequency. The percentage separation of an acoustic wave resonator is the percentage frequency separation between its resonant frequency and anti-resonant frequency, and can be computed, as follows:

$$\text{percentage separation} = \sqrt{1 + (1/\gamma)} - 1 \quad [4]$$

where $\gamma$ is the ratio of the static to the motional capacitance of the resonator (equation [3]), as determined by the material properties of the piezoelectric material and modified by the geometry of the device.

It can be appreciated from equation [1] that the resonant frequency of each of the acoustic resonators will depend on the motional arm of the BVD model 110, whereas the filter characteristics (e.g., bandwidth) will be strongly influenced by γ in equation [2]. The Quality factor (Q) for an acoustic resonator 110 may be an important figure of merit in acoustic filter design, relating to the loss of the element within the filter. Q of a circuit element represents the ratio of the energy stored per cycle to the energy dissipated per cycle. The Q factor models the real loss in each acoustic resonator, and generally more than one Q factor may be required to describe the loss in an acoustic resonator. Q factors may be defined as follows for the filter examples. The motional capacitance $C_m$ may have an associated Q defined as $Q_{cm}=10^8$; the static capacitance $C_0$ may have an associated Q defined as $Q_{c0}=200$; and motional inductance $L_m$ may have an associated Q defined as $Q_{Lm}=1000$. (Here for simplicity the loss in the motional resonance is lumped into the motional inductance and the motional capacitance is considered to be essentially loss-less.) Circuit designers may typically characterize SAW resonators by resonant frequency $\omega_R$, static capacitance $C_0$, gamma γ, and Quality factor $Q_{Lm}$. For commercial applications, $Q_{Lm}$ may be about 1000 for SAW resonators, and about 3000 for BAW resonators.

After the circuit element values of each of the electrical circuit models of the respective acoustic resonators Z have been selected, the electrical circuit model for each of the acoustic resonators Z is simulated to determine a frequency response for each of the acoustic resonators Z (step 72). The simulated frequency responses of the physical acoustic models are then respectively compared to the frequency responses of the electrical circuit models (step 74). If the simulated frequency responses of the physical acoustic models do not match the frequency responses of the electrical circuit models (step 76), the circuit elements of the electrical circuit models are selected at step 70; for example, by modifying one of the circuit elements $C_0$, $C_m$, $L_m$, and R, and steps 72-76 are repeated again.

If the simulated frequency responses of the physical acoustic models do match the frequency responses of the electrical circuit models (step 76), the resonant frequency $\omega_R$, anti-resonant frequency $\omega_A$, and static capacitance $C_0$ of each of the electrical circuit models, and the Upper Bragg Band resonance and bulk mode loss of the initial filter circuit design will be defined. The modeled filter circuit design is optimized via a suitable computer optimization technique that searches for the combination of circuit element values that best matches the desired filter response, i.e., the frequency response requirements defined in step 52 (step 78). In the illustrated embodiment, a third set of resonator characteristics is defined (e.g., by optimizing the static capacitance $C_0$ and resonant frequency $\omega_R$) for each of the acoustic resonators Z). Design tools, including Agilent Advanced Design System (ADS), among others, may use numerical optimization methods, such as Monte Carlo, gradient, etc., to improve the proposed filter circuit design. In one embodiment, one or more circuit elements in the modeled filter circuit design can be removed during the optimization process, such as disclosed in U.S. Pat. No. 8,751,993, which has been expressly incorporated herein by reference.

Next, the frequency response of the optimized filter circuit design is compared to the frequency response requirements. First, each of the physical models of the acoustic resonators Z is iteratively simulated and modified until they match the optimized filter circuit design. In particular, the physical acoustic models of the acoustic resonators Z are modified; for example, by modifying a material, one or more of a number of finger pairs, aperture size, mark-to-pitch ratio, and/or transducer metal thickness (step 80). Then, each of the physical models is simulated (e.g., using a Finite Element Model (FEM)) to determine the frequency response and a fourth set of resonator characteristics (e.g., static capacitance $C_0$ and resonant frequency $\omega_R$) of each of the physical acoustic models (step 82). The fourth set of resonator characteristics for each of the physical acoustic models is then respectively compared to the third set of resonator characteristics for each of the acoustic resonators Z of the optimized filter circuit design (step 84). If the fourth sets of resonator characteristics of the physical acoustic models do not match the third sets of resonator characteristics of the electrical circuit models in the optimized filter circuit design (step 86), the physical acoustic models are modified at step 80.

If the fourth sets of resonator characteristics of the physical acoustic models do match the third sets of resonator characteristics of the electrical circuit models in the optimized filter circuit design (step 86), the anti-resonant frequencies $\omega_R$, Upper Bragg Band resonances, and bulk mode losses of the physical models may not match the anti-resonant frequencies $\omega_R$, Upper Bragg Band resonances, and bulk mode losses of the electrical circuit models in the optimized filter circuit design. As such, the electrical circuit models in the optimized filter circuit design are replaced with the frequency responses of the simulated physical acoustic models (step 88), and the modified optimized filter circuit design is simulated to determine a frequency response (step 90). The simulated frequency response of the modified optimized filter circuit design is then compared to the frequency response requirements defined at step 52 (step 92). If the simulated frequency response does not satisfy the frequency response requirements (step 92), the process returns to step 72 whereby the electrical circuit models of the acoustic resonators Z are fitted to the new physical acoustic models. If the simulated frequency response does satisfy the frequency response requirements (step 92), an actual acoustic filter is constructed based on the most recent optimized filter circuit design with the physical resonator models (step 94). Preferably, the circuit element values of the actual acoustic filter will match the corresponding circuit element values in the most recent optimized filter circuit design.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. For example, the present invention has applications well beyond filters with a single input and output, and particular embodiments of the present invention may be used to form duplexers, multiplexers, channelizers, reactive switches, etc., where low-loss selective circuits may be used. Thus, the present invention is intended to cover alternatives, modifications, and equivalents that may fall within the spirit and scope of the present invention as defined by the claims.

What is claimed is:

1. A non-transitory computer-readable medium having stored thereon instructions that, when executed by a processing device, enable the processing device to perform a method for designing a narrowband acoustic wave microwave filter to satisfy predetermined frequency response requirements, comprising the steps of generating a modeled filter circuit design having a plurality of circuit elements comprising an acoustic resonant element defined by an electrical circuit model that comprises a parallel static branch, a parallel motional branch, and one or both of a parallel Bragg Band branch that models an upper Bragg Band discontinuity and a parallel bulk mode function that models an acoustic bulk mode loss; and generating a final circuit design for construction into an actual acoustic microwave filter, wherein generating said final circuit design comprises:
optimizing the modeled filter circuit design to generate an optimized filter circuit design;
comparing a frequency response of the optimized filter circuit design to the frequency response requirements;
selecting the optimized filter circuit design for construction into the actual acoustic microwave filter based on the comparison; and
transforming the optimized filter circuit design to a design description file that serves as an input to a construction process.

2. The medium of claim 1, wherein the parallel static branch comprises a static capacitance, and the parallel motional branch comprises a motional inductance and a motional capacitance.

3. The medium of claim 1, wherein the electrical circuit model comprises at least one resistor that models an electrical loss of the acoustic resonant element.

4. The medium of claim 1, wherein the electrical circuit model comprises the Bragg Band branch.

5. The medium of claim 4, wherein the Bragg Band branch comprises a series LRC circuit.

6. The medium of claim 1, wherein the electrical circuit model comprises the parallel bulk mode function.

7. The medium of claim 6, wherein the bulk mode function is a hyperbolic tangent function.

8. The medium of claim 7, wherein the hyperbolic tangent function is $$Y = h * \left(1 - \frac{1}{10^{\left(\frac{freq}{w(10^6 - F_b)}+1\right)}}\right),$$

where Y is the bulk mode loss in dB; h is a scaling factor used to match the loss of the bulk mode; $F_b$ is a frequency in Hz used to match the onset frequency of the bulk mode, w is a scaling factor used to match the steepness of the onset of the bulk mode, and freq is the frequency of the input signal.

9. The medium of claim 1, wherein the frequency response requirements comprise one or more of a frequency dependent return loss, insertion loss, rejection, and linearity.

10. The medium of claim 1, wherein the acoustic resonant element is one of a surface acoustic wave (SAW) resonator, a bulk acoustic wave (BAW) resonator, a film bulk acoustic resonator (FBAR), and a microelectromechanical system (MEMS) resonator.

11. The medium of claim 1, wherein the frequency response requirements comprise a pass band.

12. The medium of claim 11, wherein the passband is in the 500-3500 MHz range.

13. The medium of claim 11, wherein the passband is in the 300 MHz to 10.0 GHz range.

14. The medium of claim 11, wherein the passband is in the 300 MHz to 300 GHz range.

15. The medium of claim 1, wherein the modeled filter circuit design has an Nth order ladder topology.

16. The medium of claim 1, wherein generating the modeled filter circuit design comprises:
defining a physical model of the acoustic resonant element;
simulating the physical model of the acoustic resonant element to generate a first frequency response;
simulating the electrical circuit model of the acoustic resonant element to generate a second frequency response;
comparing the first and second frequency responses; and
modifying at least one parameter in the electrical circuit model based on the comparison prior to the optimization of the modeled electrical filter circuit design.

17. The medium of claim 16, wherein the physical model of the acoustic resonant element is simulated using a Finite Element Model (FEM).

18. The medium of claim 16, wherein defining the physical model of the acoustic resonant element comprises selecting a parameter consisting of at least one of a material, one or more of a number of finger pairs, aperture size, mark-to-pitch ratio, and transducer metal thickness.

19. The medium of claim 16, wherein defining the physical model of the acoustic resonant element comprises:
defining a first set of resonator characteristics for the acoustic resonant element;
simulating the physical model of the acoustic resonant element to generate a second set of resonator characteristics;
comparing the first and second sets of resonator characteristics; and
modifying at least one parameter of the physical model of the acoustic resonant element based on the comparison.

20. The medium of claim 19, wherein each of the first and second sets of resonator characteristics comprises one or both of a resonant frequency and a static capacitance.

21. The medium of claim 20, wherein optimizing the modeled filter circuit design comprises optimizing the one or both of a resonant frequency and a static capacitance.

22. The medium of claim 19, wherein comparing the frequency response of the optimized filter circuit design to the frequency response requirements, comprises:
simulating the electrical circuit model of the acoustic resonant element of the optimized filter circuit design to generate a third set of resonator characteristics;
simulating the physical model of the acoustic resonant element to generate a fourth set of resonator characteristics;
comparing the third set of resonator characteristics to the fourth set of resonator characteristics;
modifying the parameter of the physical model of the acoustic resonator based on the comparison;
simulating the physical model of the acoustic resonant element with the modified parameter to generate another frequency response;
replacing the electrical circuit model of the acoustic resonant element in the optimized filter circuit design with the other frequency response to create a modified optimized filter circuit design; and
simulating the modified optimized filter circuit design to create the frequency response.

23. The medium of claim 22, wherein each of the third and fourth sets of resonator characteristics comprises one or both of a resonant frequency and a static capacitance.

* * * * *